United States Patent [19]
Nakatani

[11] Patent Number: 5,636,311
[45] Date of Patent: *Jun. 3, 1997

[54] TAPE DUBBING AND DIVIDED MASTER TAPE PRODUCING SYSTEM

[75] Inventor: Yoichiro Nakatani, Mito, Japan

[73] Assignee: Victor Company of Japan, Ltd., Yokohama, Japan

[*] Notice: The term of this patent shall not extend beyond the expiration date of Pat. No. 5,481,411.

[21] Appl. No.: 483,394

[22] Filed: Jun. 7, 1995

Related U.S. Application Data

[63] Continuation-in-part of Ser. No. 396,454, Feb. 28, 1995, Pat. No. 5,481,411, which is a continuation of Ser. No. 116,948, Sep. 3, 1993, abandoned, which is a continuation of Ser. No. 930,819, Aug. 14, 1992, abandoned.

[51] Int. Cl.$^6$ ................................................. H04N 9/74
[52] U.S. Cl. ........................... 386/4; 386/53; 386/54; 360/13; 360/15; 360/23
[58] Field of Search .................. 360/13, 15, 16, 360/17, 23; 358/311, 335; 386/33, 66, 109, 4, 53, 54

[56] References Cited

U.S. PATENT DOCUMENTS

| | | | |
|---|---|---|---|
| 4,410,917 | 10/1983 | Newdoll et al. | 360/15 |
| 5,481,411 | 1/1996 | Nakatani | 360/15 X |

FOREIGN PATENT DOCUMENTS

| | | |
|---|---|---|
| 0016560 | 10/1980 | European Pat. Off. . |
| 0261826 | 3/1988 | European Pat. Off. . |
| 0312406 | 4/1989 | European Pat. Off. . |
| 0475689 | 3/1992 | European Pat. Off. . |
| 58-118009 | 7/1983 | Japan . |
| 59-213034 | 12/1984 | Japan . |
| 60-19567 | 5/1985 | Japan . |
| 61-35611 | 8/1986 | Japan . |
| 61-269228 | 11/1986 | Japan . |
| 1-59630 | 3/1989 | Japan . |
| 1-236429 | 9/1989 | Japan . |

OTHER PUBLICATIONS

Patent Abstracts of Japan, 10(76), 26 Mar. 1986 for JP 60–214492, Amano et al. Editing Method of Recording and Reproducing Device of Digital Signal.

*Primary Examiner*—Andrew L. Sniezek
*Attorney, Agent, or Firm*—Michael N. Meller

[57] ABSTRACT

A high speed dubbing apparatus for producing magnetic tapes such as video, audio or computer soft tapes, is provided. Typical form of the apparatus may comprise 3 master tape playback devices for synchronously playing back 3 divided master tapes respectively recorded with 3 divided master signals obtained by dividing time-divisionally an original master signal having an original data sequence by 3 and for outputting the 3 divided master signals, a triple speed recording signal producing device for time-compressing each of the 3 divided master signals to ⅓ to obtain a triple speed recording signal from the 3 divided master signals while restoring the original data sequence in the triple speed recording signal and a recording device for recording the triple speed recording signal on a plurality of slave tapes running at a speed which is 3 times the normal playback speed of the slave tapes.

12 Claims, 22 Drawing Sheets

FIRST DIVIDED MASTER TAPE (MA)

| VIDEO SIGNAL | 1 C F | | 3 C F | | 5 C F | | 7 C F | |
|---|---|---|---|---|---|---|---|---|
| AUDIO SIGNAL | 1 C F | | 3 C F | | 5 C F | | 7 C F | |
| TIME CODE | 1 | 2 | 3 | 4 | 5 | 6 | 7 | 8 |

*Fig. 2(a)*

SECOND DIVIDED MASTER TAPE (MB)

| VIDEO SIGNAL | 2 C F | | 4 C F | | 6 C F | | 8 C F | |
|---|---|---|---|---|---|---|---|---|
| AUDIO SIGNAL | 2 C F | | 4 C F | | 6 C F | | 8 C F | |
| TIME CODE | 1 | 2 | 3 | 4 | 5 | 6 | 7 | 8 |

*Fig. 2(b)*

FIRST REPRODUCED SIGNAL

Fig.4(a)

| TIME CODE 1a | 1 | 2 | 3 | 4 | 5 | 6 | 7 | 8 |
|---|---|---|---|---|---|---|---|---|
| VIDEO(1b) OR AUDIO(1c) SIGNAL | 1 C F | | 3 C F | | 5 C F | | 7 C F | |

DOUBLE SPEED RECORDING SIGNAL

Fig.4(b)

| VIDEO(3a) OR AUDIO(3b) SIGNAL | ×2 1CF | ×2 2CF | ×2 3CF | ×2 4CF | ×2 5CF | ×2 6CF |
|---|---|---|---|---|---|---|

SECOND REPRODUCED SIGNAL

Fig.4(c)

| VIDEO(2b) OR AUDIO(2c) SIGNAL | 2 C F | | 4 C F | | 6 C F | | 8 C F | |
|---|---|---|---|---|---|---|---|---|
| TIME CODE 2a | 1 | 2 | 3 | 4 | 5 | 6 | 7 | 8 |

FIRST DIVIDED MASTER TAPE (MAA)

| VIDEO SIGNAL | 1CF | 4CF | 7CF | 10CF |
|---|---|---|---|---|

| AUDIO SIGNAL | 1CF | 4CF | 7CF | 10CF |
|---|---|---|---|---|

| TIME CODE 1aa | 1 | 2 | 3 | 4 | 5 | 6 | 7 | 8 |
|---|---|---|---|---|---|---|---|---|

*Fig.12 (a)*

SECOND DIVIDED MASTER TAPE (MBB)

| VIDEO SIGNAL | 2CF | 5CF | 8CF | 11CF |
|---|---|---|---|---|

| AUDIO SIGNAL | 2CF | 5CF | 8CF | 11CF |
|---|---|---|---|---|

| TIME CODE 2aa | 1 | 2 | 3 | 4 | 5 | 6 | 7 | 8 |
|---|---|---|---|---|---|---|---|---|

*Fig.12 (b)*

THIRD DIVIDED MASTER TAPE (MCC)

| VIDEO SIGNAL | 3CF | 6CF | 9CF | 12CF |
|---|---|---|---|---|

| AUDIO SIGNAL | 3CF | 6CF | 9CF | 12CF |
|---|---|---|---|---|

| TIME CODE 3aa | 1 | 2 | 3 | 4 | 5 | 6 | 7 | 8 |
|---|---|---|---|---|---|---|---|---|

*Fig.12 (c)*

TAPE DUBBING AND DIVIDED MASTER TAPE PRODUCING SYSTEM

The present application is a continuation-in-part application of the continuation application Ser. No. 396,454 filed on Feb. 28, 1995 now U.S. Pat. No. 5,481,411, which is continued from the U.S. patent application Ser. No. 116,948 filed on Sep. 3, 1993, abandoned which is continued from the U.S. patent application Ser. No. 930,819 filed on Aug. 14, 1992 abandoned titled "Tape Dubbing and Divided Master Tape Producing System" by the inventor Yoichiro Nakatani.

BACKGROUND OF THE INVENTION

1. Field of the Invention

The present invention relates to an apparatus for dubbing a magnetic tape such as video soft tape, audio soft tape or computer soft tape, etc., at high speed and a device for producing a divided master tape for high speed dubbing.

In this specification, terms involving a tape speed are defined in accordance with the following definitions:

"N Speed Playback"

To playback a tape at a running speed which is N times the speed with which the tape is recorded, where N is an integer larger than 1.

"N Speed Recording"

To record a signal reproduced from a master tape played back according to the "N speed Playback" on a recording medium, or to record a signal on a tape running at a speed which is N times a nominal playback speed of that tape, where N is an integer larger than 1.

"N Speed Dubbing"

A dubbing operation in which a master tape for dubbing is played back according to the "N speed Playback" and a resultant reproduced signal thus obtained is recorded as a recording signal on a slave tape running at a speed which is N times a nominal playback speed of the slave tape, where N is an integer larger than 1.

In this case, although a transfer rate of the recording signal from a master tape playback device to a slave tape recording device is N times that of the original recording signal which is used for recording the master tape, actual running speeds of the master and slave tapes are not necessarily identical each other but they can be different each other in this "N Speed Dubbing" operation.

"Double Rate"

A status of signal transfer rate which is twice an original transfer rate (signal transfer rate used for master tape recording).

"Triple Rate"

A status of signal transfer rate which is three times an original transfer rate (signal transfer rate used for master tape recording).

"Triple rate" when referred to in a dubbing apparatus, is also referred to as "triple speed".

"Real Time Speed"

This represents the "N Speed Playback", the "N Speed Recording", or the "N Speed Dubbing" where N is 1, or a tape speed which is equal to its original or nominal speed. "Real time speed" is also referred to as "standard speed" or "normal playback speed", at which the recoded video and/or audio signal is played back to produce normal picture and/or sound for users.

"Double Speed"

This represents the "N Speed Playback", the "N Speed Recording", or the "N Speed Dubbing" where N is 2.

2. Description of the Related Art

A dubbing apparatus in which a signal reproduced by a master tape playback device is supplied to a plurality of slave recording devices to dub the signal on slave magnetic tapes in real time has been known.

Further, a contact print method in which a mirror image tape signal pattern is provided on a master tape having relatively large coercive force and is transferred to a slave magnetic tape by making a magnetic surface of the master tape in intimate contact with the slave magnetic tape while externally applying a low frequency magnetic field thereto has been known as a high speed dubbing system.

Since the former conventional dubbing system is of a real time dubbing system in which the slave tapes are running at their nominal playback speed and recorded with a signal obtained by playing back the master tape at its recording speed, efficiency of slave tape production is low. As to the contact print method, there are problems of degradation of signal frequency characteristics and/or S/N ratio.

Besides, in a digital VTR, etc., according to D2 standard (one of the Industry standards for digital video tape recording), an accompanying audio signal becomes discontinuous at a tape editing point. In order to prevent such signal discontinuity from being reproduced as noise, such audio signal is faded in at an editing start point and faded out at an editing end point, with a silence period of about 3 msec therebetween.

Therefore, when a divided master tape is produced or a produced divided master tape is played back by using such VTR, an audio signal becomes discontinuous at an editing point provided during production of the divided master tape.

SUMMARY OF THE INVENTION

The present invention is made in view of above problems and has an object to provide a high efficiency, high performance dubbing apparatus and a divided master tape producing apparatus for realizing high speed dubbing.

Specifically in order to solve the problems mentioned previously, a dubbing apparatus according to the present invention is featured by comprising an N number of divided master tape playback devices for synchronously playing back a corresponding number of divided master tapes. These divided master tapes respectively recorded with N divided master signals obtained by dividing time-divisionally an original master signal by N. The N divided master signals as outputted. The original master signal has an original data sequence, and an N speed recording signal producing device for time-compressing each of the N divided master signals to 1/N to obtain an N speed recording signal from the N divided master signals. The original data sequence is restored in the N speed recording signal. The recording device is used for recording the N speed recording signal on a slave tape running at a speed which is N times a nominal playback speed of the slave tape.

According to another aspect of the present invention, a dubbing apparatus features each of the corresponding number of divided master tapes is recorded with a first audio signal having a predetermined delay time and a second audio signal having no delay. The dubbing apparatus further comprises a delay circuit for delaying the second audio signal reproduced from a corresponding one of the N number of divided master tape playback devices, and an audio signal switching circuit for switching between the first audio signal having a predetermined delay time which is reproduced from a corresponding one of the N number of divided master tape playback devices. The second audio signal delayed by the delay circuit, making it possible to obtain an audio signal of no interruptions.

Another and specific object of the present invention is to provide a divided master tape producing apparatus comprising a master tape playback device for playing back a master tape recorded with a master signal, a signal dividing device for dividing the master signal reproduced from the master tape playback device into an N number of master signals at a predetermined time interval, and a divided master tape recording device for producing divided master tapes by recording the divided N number of master signals on a corresponding number of divided master tapes, a corresponding one of the divided master signals being arranged to be continuous on each of the divided master tapes, so that N number of divided master tapes having a continuous signal recorded thereon respectively, are produced.

The signal dividing device may further comprise a memory device for storing the N number of master signals and a supplying device for supplying the N number of master signals stored in the memory device to corresponding recording units of the divided master tape recording device. Accordingly, it is possible to prolong the time of intermittent recording operation of the divided master tape recording device and to record signals with improved stability.

According to another aspect of the present invention, a divided master tape producing apparatus is featured by comprising a master tape playback device for playing back a master tape recorded with a master signal, a signal storing/dividing device for storing temporarily the master signal reproduced from the master tape playback device and dividing the master signal stored therein into divided master signals and for reading out the divided master signals, and a divided master tape recording device for recording the divided master signals read out from the signal storing/dividing the continuously on magnetic tapes. Accordingly, it is possible to prolong the time of intermittent recording operation of the divided master tape recording device and to record signals with improved stability.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 2(a) and 2(b) illustrate a recorded content of 2 divided master tapes to be used in the apparatus in FIG. 1;

FIGS. 4(a) through 4(c) show an operation of a double speed recording signal producing device according to the first embodiment of the present invention;

FIGS. 12(a) through 12(c) illustrate recorded contents of 3 divided master tapes to be used in the apparatus in FIG. 11;

DETAILED DESCRIPTION OF THE PREFERRED EMBODIMENTS

First Embodiment

A first embodiment of the present invention will be described with reference to FIGS. 1 to 10.

Figure 1:
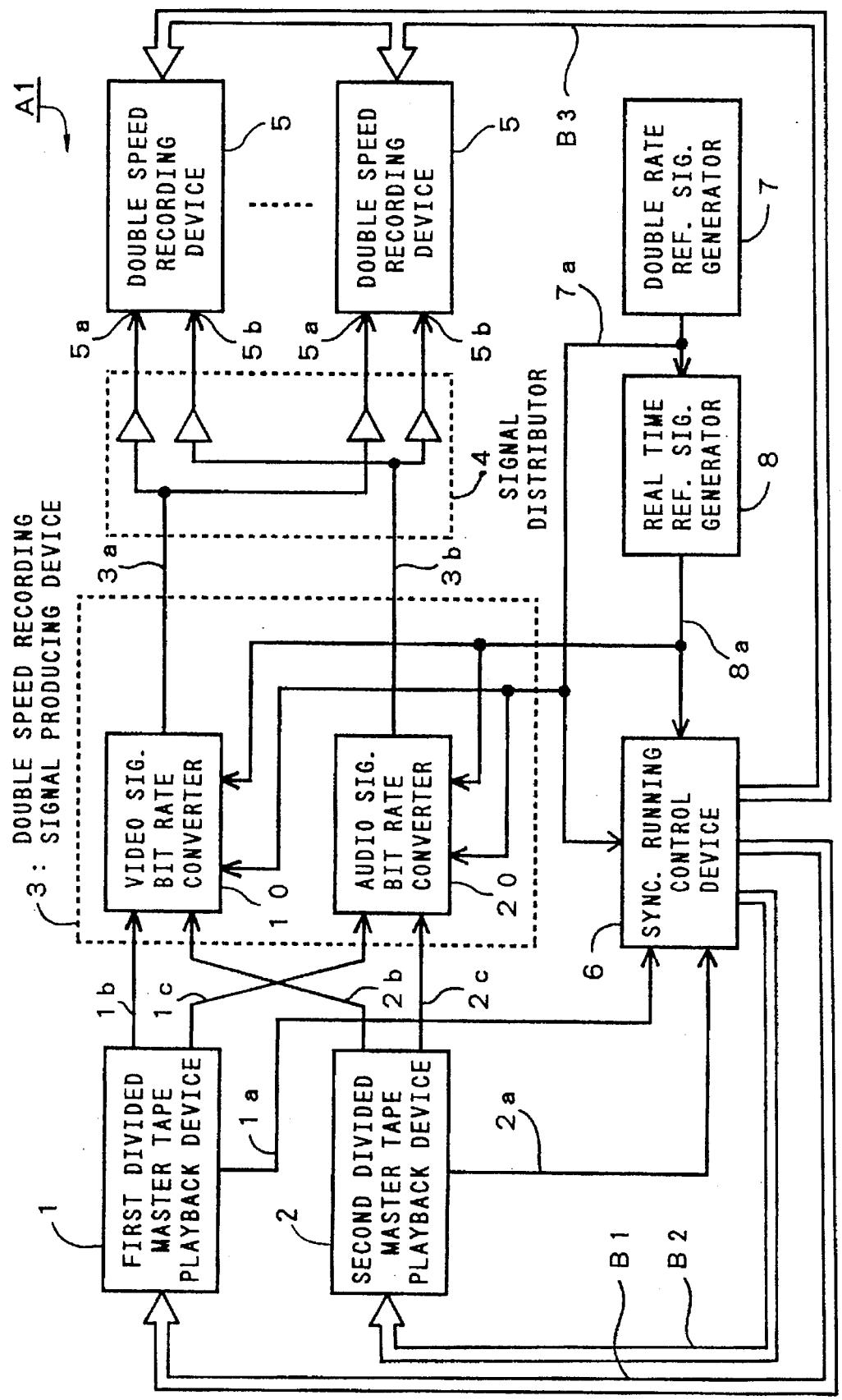
FIG. 1 is a block diagram of a double speed dubbing apparatus according to a first embodiment of the present invention.

FIG. 1 is a block diagram of a double speed dubbing apparatus according to the present invention.

The double speed dubbing apparatus A1 in FIG. 1 is adapted to dub magnetic video tapes recorded with video and audio signals.

The dubbing apparatus A1 comprises first and second divided master tape playback devices 1 and 2, a double speed recording signal producing device 3, a signal distributor 4, a single or a plurality of double speed recording devices 5, a synchronous running control device 6, a double rate reference signal generator 7 and a real time reference signal generator 8.

FIG. 2(a) and FIG. 2(b) illustrate first and second divided master tapes MA and MB respectively and recorded contents therein respectively.

On the first divided master tape MA shown in FIG. 2(a), a video signal and an audio signal related to odd numbered color frames (CF) are recorded together with a time code and, on the second divided master tape MB shown in FIG. 2(b), video and audio signals related to even numbered color frames are recorded, similarly with a time code.

On each of the master tapes MA and MB, the time code is recorded as such that it increments 2 counts for every video color frame.

These divided master tapes MA and MB are played back by the first and second divided master tape playback devices 1 and 2 shown in FIG. 1, respectively.

The double rate reference signal generator 7 produces a video reference signal or a timing signal 7a at double speed, that is, at a rate twice the original recording rate.

The real time reference signal generator 8 produces a real-time timing signal 8a on the basis of the double speed timing signal 7a.

The synchronous running control device 6 supplies the real-time timing signal 8a through playback device control buses B1 and B2 to the first and second divided master tape playback devices 1 and 2, respectively, and controls these devices 1 and 2 to run synchronized together at a real time playback speed, by monitoring time code signals 1a and 2a from the first and second divided master tape playback devices 1 and 2, and sending running control information through the control buses B1 and B2 to the first and second divided master tape playback devices 1 and 2, respectively.

Further, the synchronous running control device 6 supplies the double speed timing signal 7a generated by the double rate reference signal generator 7 and running control information to the respective double speed recording devices 5 through the control bus B3 to control the double speed recording devices, so that they run at the double speed in synchronization with the playback operation of the respective master tape playback devices 1 and 2.

The double speed recording signal producing device 3 for producing a double speed recording signal comprises a bit rate converter 10 for video signal and a bit rate converter 20 for audio signal.

The video signal bit rate converter 10 responds to a real time video signal 1b reproduced (with real time speed) by the first divided master tape playback device 1 and to a real time video signal 2b reproduced by the second divided master tape playback device 2, and makes the bit rates of these video signals 1b and 2b double, respectively, and combines the respective video signals 1b and 2b into a single composed video signal 3a which is arranged in the color frame sequence.

Likewise, the audio signal bit rate converter 20 responds to audio signals 1c and 2c outputted from the respective playback devices 1 and 2 and doubles their bit rates respectively and combines them in the predetermined sequence.

When video and audio signals recorded on the divided master tapes MA and MB are digital signals, the respective bit rate converters 10 and 20 comprise temporary storage devices such as shift registers or RAMs, etc., and signal processing circuits such as read/write control devices therefor, and write the digital signals to or read them from the temporary storage devices in synchronism with the real time timing signal 8a.

FIGS. 4(a) and 4(c) show respectively time code signals 1a and 2a, video signals 1b and 2b (or audio signals 1c and 2c) which are reproduced from the first and second divided master tape playback devices 1 and 2 then inputted to the double speed recording signal producing device 3.

FIG. 4(b) shows the above video (or audio) signal being converted into a doubled bit rate, arranged in a order of color frames and outputted by the double speed recording signal producing device 3 as a composed video signal 3a (or audio signal 3b).

In a case where video and audio signals recorded on the divided master tapes MA and MB are analog signals, the respective bit rate converters 10 and 20 comprise, in addition to the components described above for digital signals, A/D converters for converting reproduced analog signals into corresponding digital signals which are stored in the temporary storage device and D/A converters for converting the digital signals having doubled bit rate read out from the temporary storage device into analog signals.

The signal distributor 4 comprises a plurality of buffer amplifiers, etc., which operate to supply double speed video signal 3a and double speed audio signal 3b outputted from the double speed recording signal producing device 3 to video signal recording input terminals 5a and audio signal recording input terminals 5b of the respective double speed recording devices 5, respectively.

Figure 3:
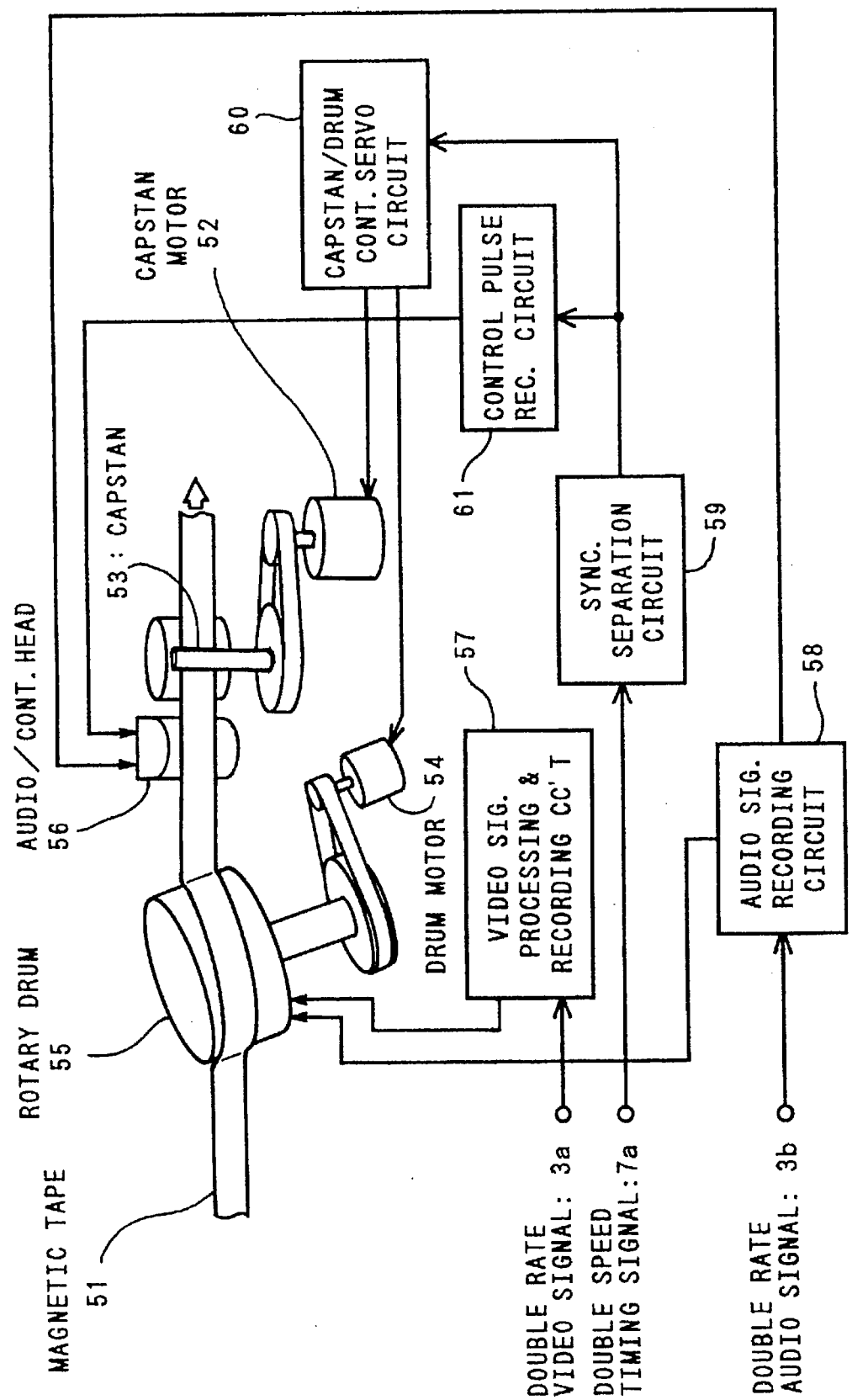
FIG. 3 is a block diagram of a double speed recording device for video tape according to the first embodiment of the present invention.

FIG. 3 is a block diagram of the double speed recording device 5 for dubbing double speed video and audio signals 3a, 3b on a magnetic tape 51 (slave tape) of VHS (one of the industry standard formats) system.

The magnetic tape 51 to be used as a slave tape is transported by a capstan 53 which is driven by a capstan motor 52, and is recorded with video recording signal and audio recording signal at a double rate (doubled data transmission rate) and a control signal with respective video and audio recording heads (not shown) and a control head 56 while the magnetic tape 51 is wrapped around and passed along a rotary drum 55 driven by a drum motor 54 and is taken up on a take-up reel (not shown).

A video signal processing and recording circuit 57 derives a luminance signal and a chrominance signal from the double rate video signal 3a, frequency-modulates the luminance signal, converts the chrominance signal into lower frequency signal, combines them again and outputs a resultant mixture through a recording amplifier (not shown) to the video recording head of the rotary drum 55 to record it on the magnetic tape 51.

An audio signal recording circuit 58 frequency-modulates a left channel signal of the double rate audio signal 3b to a frequency of 1.3 MHz×2 and a right channel signal thereof to a frequency of 1.7 MHz×2, combines them and records a resultant signal on a video track portion of the magnetic tape 51 through the recording amplifier (not shown) and the FM audio signal recording head (not shown) mounted on the rotary drum 55.

In this recording system, after an FM signal related to audio signal is recorded on an under layer portion of the magnetic tape 51 in the form of under layer recording when the video signal is over-written on the same track of a surface portion of the tape after the FM audio signal is recorded.

For a longitudinal track audio signal, it is conventionally recorded on a longitudinal audio track through an audio recording amplifier (not shown) and an audio/control head 56.

The double speed timing signal (double rate video reference signal) 7a generated by the double rate reference signal generator 7 is supplied to a synch. separator circuit 59. The circuit 59 separates, from the signal 7a, a vertical synchronizing signal and outputs the latter to a capstan/drum control servo circuit 60 and a control pulse recording circuit 61.

The capstan/drum control servo circuit 60 controls the drum motor 54 and the capstan motor 52 by using the vertical synchronizing signal as a reference.

When an NTSC system video signal is recorded at a double speed, the rotary drum 55 having a pair of heads is controlled such that its rotational speed becomes 60 rps (revolution per second) when its real time speed is 30 rps and simultaneously controls the capstan 53 as such that the running speed of the magnetic tape 51 becomes 6.67 cm/sec when its real time speed is 3.335 cm/sec.

The control pulse recording circuit 61 produces a control pulse signal by wave-shaping the vertical synchronizing signal from the synch. separator circuit 59 and records it on a control track of the magnetic tape 51 through the audio/control head 56.

With the construction mentioned above, since the double speed recording signal producing device 3 produces the double speed recording signals 3a and 3b shown in FIG. 4(b) on the basis of the reproduced signals 1b, 1c, 2b and 2c which are obtained by playing the divided master tapes MA and MB in real time on the respective first and second divided master tape playback devices 1 and 2, it is possible to dub a slave tape at a double speed by recording the signals 3a and 3b in a double speed mode.

Figure 5:
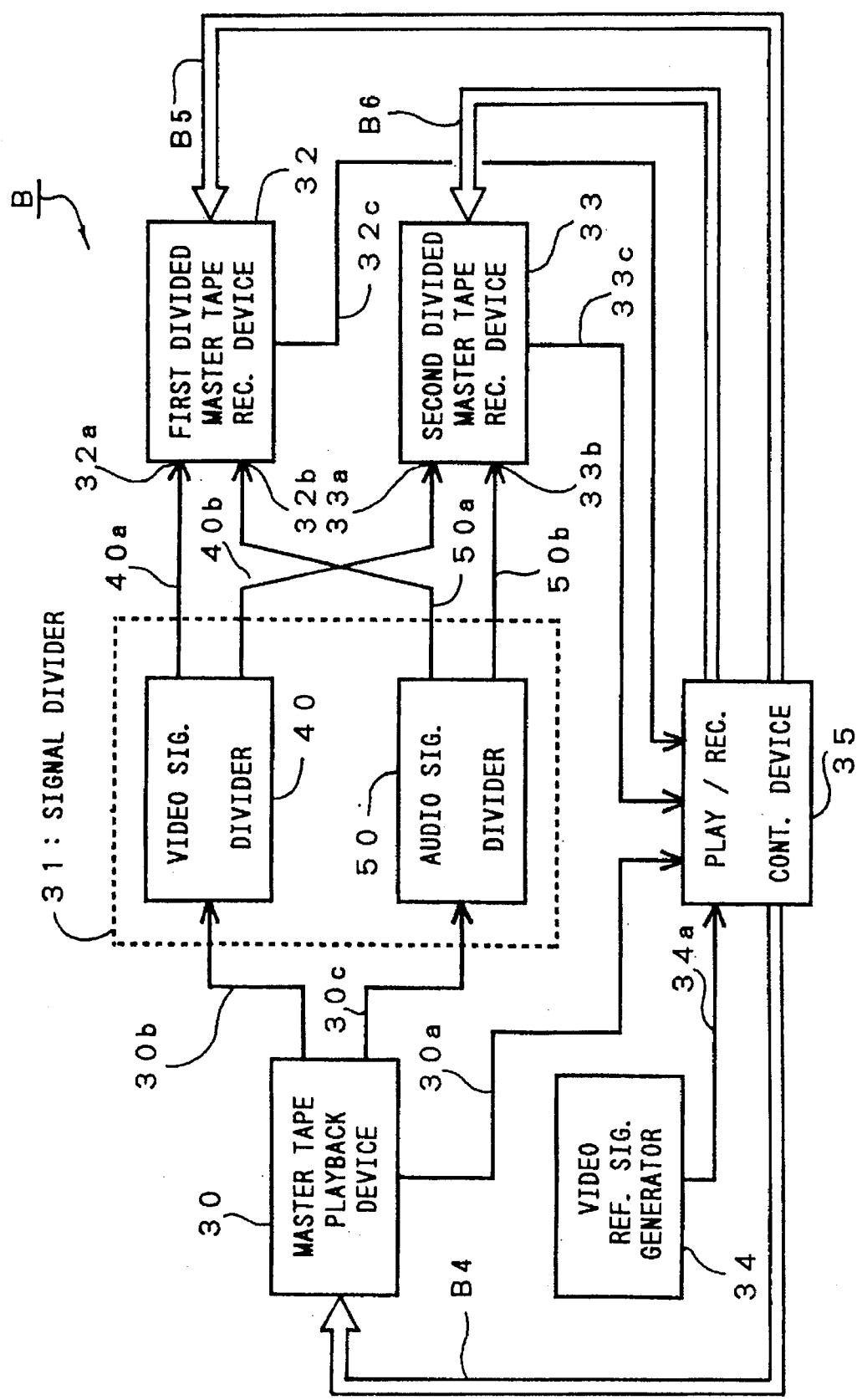
FIG. 5 is a block diagram of a divided master tape producing apparatus for producing divided master tapes used on the first embodiment of the present invention.

FIG. 5 is a block diagram of divided master tape producing device for producing divided mater tapes used on a first embodiment of the present invention.

The divided master tape producing apparatus "B" is adapted to produce the divided master tapes MA and MB which are respectively recorded with 2 time-divisionally divided master signals of master video and audio signals reproduced from an original master tape "M" (not shown), respectively.

In this embodiment, the divided master tapes MA and MB are produced on the basis of the original master "M" tape having a prerecorded time code.

The divided master tape producing device "B" comprises a master tape playback device 30, a signal divider 31, a first and second divided master tape recording devices 32 and 33, a video reference signal generator 34 and a playback/recording control device 35.

The playback/recording control device 35 supplies a video reference signal 34a outputted from the video reference signal generator 34 to the master tape playback device 30 through a reproducing control bus B4 and, when the original master tape "M" loaded in the master tape playback device 30 has a prerecorded time code, the control device 35 controls the playback device 30 to play the original master tape "M" at a predetermined speed by monitoring a reproduced time code signal 30a.

Further, the playback/recording control device 35 supplies the video reference signal 34a through respective recording device control buses B5 and B6 to the respective divided master tape recording devices 32 and 33 and controls the latter such that they record the video reference signal 34a alternately, thus time-divisionally, between the divided master tape recording devices 32 and 33.

Alternatively, the control of the first and second divided master tape recording devices 32 and 33 may be performed by using the time code signal 30a instead of the video reference signal 34a. Further, the playback/recording control device 35 may control the first and second divided master tape recording devices 32 and 33 in synchronism with each other by monitoring the time code 30a reproduced from the master tape playback device 30 and time codes 32c and 33c reproduced from the first and second divided master tape recording devices 32 and 33.

The signal divider 31 comprises a video signal divider 40 and an audio signal divider 50.

The video signal divider 40 is adapted to output the reproduced video signal 30b from the master tape playback device 30 by switching alternately thus time-divisionally at a rate of color frame to supply a video signal 40a of odd numbered color frames to a video signal recording input terminal 32a of the first divided master tape recording device 32 and a video signal 40b of even numbered color frames to a video signal recording input terminal 33a of the second divided master tape recording device 33.

The audio signal divider 50 serves to output the reproduced audio signal 30c by switching it at the same timing as that of the video signal divider 40 as such that audio signal 50a related to the odd numbered color frame to an audio recording signal input terminal 32b of the first divided master tape recording device 32 and an audio signal 50b related to the even numbered color frames to an audio recording signal input terminal 33b of the second divided master tape recording device 33.

When the original master signal recorded on the original master tape "M" is an analog signal, the signal dividers 40 and 50 are constituted with video signal switching circuits (analog switches for video signal) etc., respectively. When the signal recorded on the original master tape "M" is a digital signal, they may be constituted as such that signal distribution is performed by logic circuits.

In the divided master tape producing device "B" constituted as mentioned above, the respective divided master tape recording devices 32 and 33 operate alternatively and intermittently in synchronism with the playback of the original master tape "M" on the master tape playback device 30 in the manner that the reproduced video signal 30b and the reproduced audio signal 30c from the original master tape "M" is distributed cyclically and time divisionally at a predetermined interval to respective divided master tape recording devices 32 and 33. Accordingly, the first and second divided master tapes MA and MB shown in FIGS. 2(a) and 2(b) are produced.

Although, in this embodiment, the original master signal is divided to two divided master tapes, it is possible to divide the original master signal by 3 or more.

Figure 6:
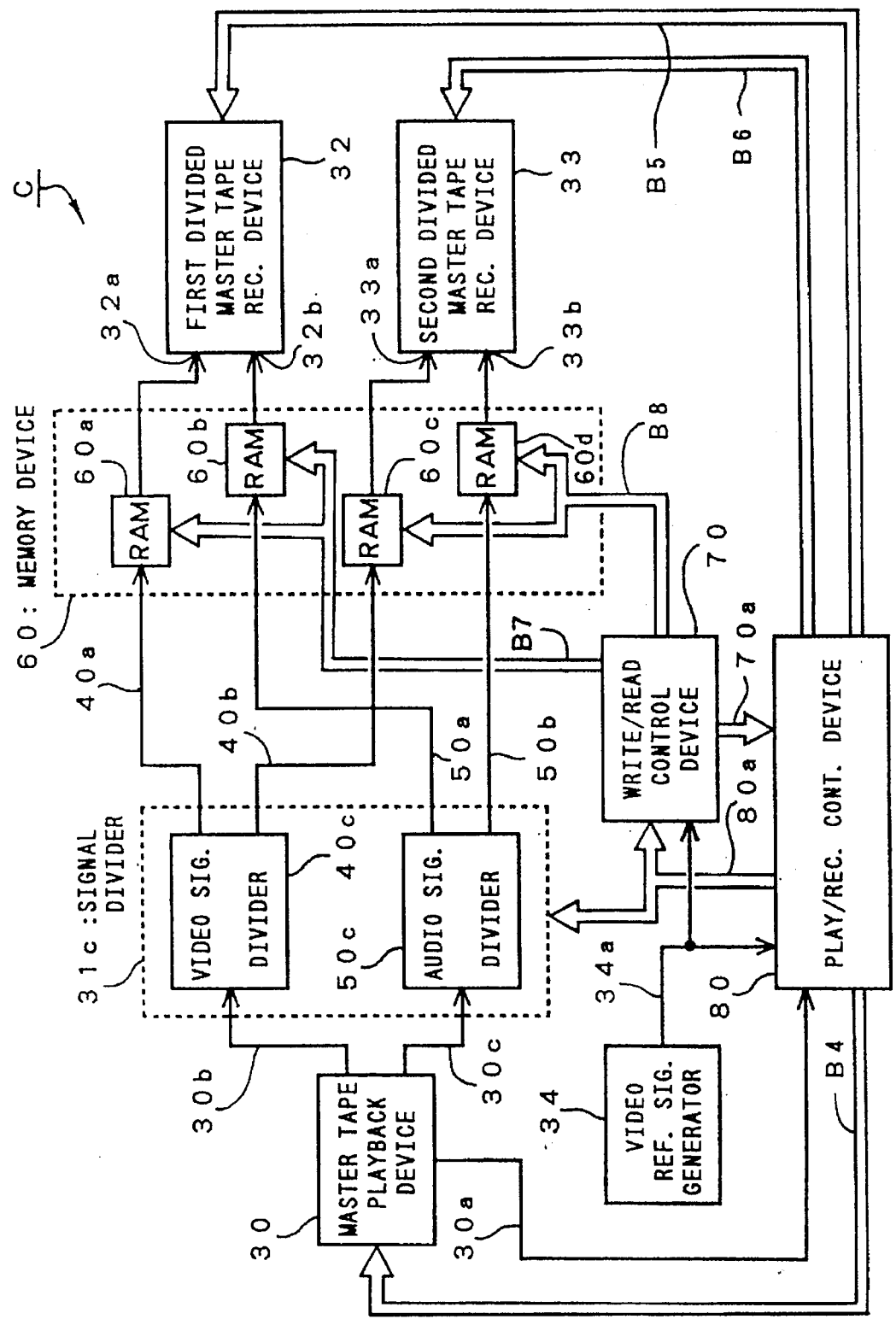
FIG. 6 is a block diagram of another divided master tape producing apparatus for producing divided master tapes used on the first embodiment of the present invention.

FIG. 6 is a block diagram of another divided master tape producing device for producing divided master tapes used on the first embodiment of the present invention.

The divided master tape producing device "C" comprises a memory device 60 for temporarily storing video signals 40a and 40b and audio signals 50a and 50b of respective time-division signals from a signal divider 31C, a write/read control device 70 for controlling write and read operations with respect to the memory device 60 and a playback/recording control device 80 associated with the write/read control device 70 for controlling operations of the master tape playback device 30 and the respective master tape recording devices 32 and 33.

The memory device 60 comprises a plurality of RAMs (random access memories) 60a, 60b, 60c and 60d. The respective RAMs 60a–60d are 2-port memories each having a write port and a read port.

The write/read control device 70 responds to a video reference signal from a video reference signal generator 34 to control the write/read operations.

The write/read control device 70 switches a write operation, through RAM control buses B7 and B8, to either a first series RAMs 60a and 60b or a second series RAMs 60c and 60d, according to a series select instruction 80a given by the playback/recording control device 80.

The write/read control device 70 starts reading continuously, with a phase shifted from the write timing, the data stored up to the moment when a total data amount written in the respective RAMs 60a–60d reaches a preset amount, and concurrently sends a read start instruction 70a to the playback/recording control device 80.

The playback/recording control device 80 responds to the read start instruction 70a to send, through the recording device control buses B5 and B6, an instruction for turning the first and second divided master tape recording devices 32 and 33 into a recording mode.

It should be noted that the write/read control device 70 may be constituted as such that it sends a pause instruction to the playback/reproducing control device 80 to temporarily stop a reproducing operation of the master tape playback device 30, when the respective RAMs 60a–60d are completed to be written with a predetermined amount of data, and during this stop period, the write/read control device 70 reads the contents of the RAMs 60a–60d simultaneously and to turn the first and second divided master tape recording devices 32 and 33 into a recording mode through the playback/recording control device 80.

As mentioned above, since the divided master tape producing device "C" according to the present invention is constructed that, after storing the two divided master signals in the storage device 60, it supplies these signals to corresponding divided master tape recording devices 32 and 33 continuously, it is possible to prolong the time for intermittent recording operation of the first and second divided master tape recording devices 32 and 33, causing a recording to be more stable.

Figure 7:
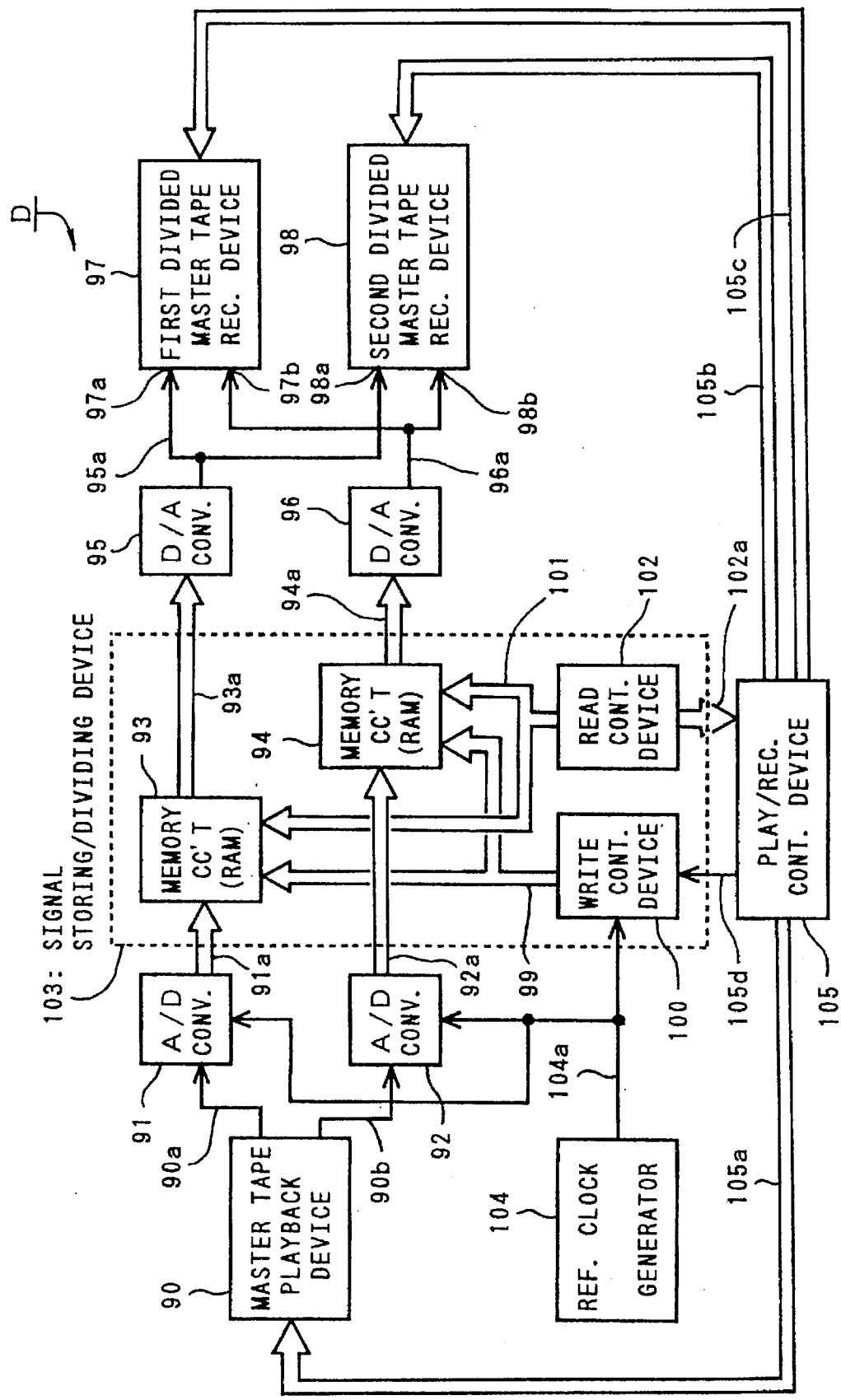
FIG. 7 is a block diagram of further divided master tape producing apparatus for producing divided master tapes used on the first embodiment of the present invention.

FIG. 7 shows a block diagram of further divided master tape producing apparatus for producing divided master tapes used on the first embodiment of the present invention.

The divided master tape producing apparatus "D" shown in FIG. 7 comprises A/D converters 91 and 92 for converting an analog video signal 90a and an analog audio signal 90b outputted from a master tape playback device 90 into digital signals, respectively, memory circuits 93 and 94 for storing an A/D converted video signal 91a and an audio signal 92b and D/A converters 95 and 96 for converting the digital video and audio signals 93a and 94a read out from the memory circuits 93 and 94 into analog signals, respectively.

When the master tape "M" and first and second divided master tape recording devices 97 and 98 are of digital type, respectively, the A/D converters 91 and 92 and the D/A converters 95 and 96 may be omitted.

A divided video signal 95a from the D/A converter 95 for video signal is supplied to video signal input terminals 97a and 98a of the first and second divided master tape recording devices 97 and 98 signal paths thereto are regarded as first and second channels.

A divided audio signal 96a from the D/A converter 96 for audio signal is supplied to audio signal recording input terminals 97b and 98b of the respective divided master tape recording devices 97 and 98.

The respective memory circuits 93 and 94 are constituted with 2-port RAMs each having a write port and a read port.

The digital signals 91a and 92a from the A/D converters 91 and 92 are written in the memory circuits 93 and 94 according to a write address and write timing signals supplied from a write control device 100 through a write control bus 99 and the stored signals are read out therefrom according to a read address and read timing signals, etc., supplied from a read control device 102 through a read control bus 101.

The memory circuits 93 and 94 and the write and read control devices 100 and 102 constitute a signal storing/dividing device 103 which produces two divided master signals divided at a predetermined time interval by temporarily storing the divided signals and changing reading order of the divided signals thereafter.

A reference clock generator 104 produces a timing signal 104a which provides references for sampling period of the A/D converter and a write timing.

A playback/recording control device 105 controls a reproducing operation of the master tape playback device 90 and recording operations of the first and second divided master tape recording devices 97 and 98.

The playback/recording control device 105 controls start, stop and reproducing speed of the master tape playback device 90 through a playback control bus 105a and controls start, stop, recording speed and recording position of the tapes of the first and second divided master tape recording devices 97 and 98 through similar recording control buses 105b and 105c.

The playback/recording control device 105 turns the master tape reproducing device 90 into a playback state and simultaneously supplies a writing start instruction 105d to the control device 100 for causing the memory circuits 93 and 94 to start writing.

The read control device 102 sends a recording instruction 102a to the playback/recording device 105 at a time when a series of write operations completes or digital signal data has been written in substantially a half of a whole memory area by the series of write operations. The recording instruction signal 102a contains an information indicative of whether a signal to be read belongs to the first channel or the second channel mentioned before and the playback/recording control device 105 turns the assigned first or second divided master tape recording device 97 or 98 into recording state.

The read control device 102, when the recording instruction 102a is outputted, reads the respective memory circuits 93 and 94. This reading is performed as such that a signal which is continuous in time is divided into two series signals at a predetermined time interval. For example, after the recording instruction 102a is sent to the first divided master tape recording device 97, data corresponding to a period of 0–10 seconds of the master tape playback time is read out and then data of 20–30 seconds is read out, and, so on. Then, after the device 98 is selected in response to the recording instruction 102a forwarded to the device 98, data of 10–20 and 30–40 seconds and so on are read out.

In the divided master tape producing apparatus "D" according to the present invention, the time divisional signal division is performed by changing the sequence of reading signals stored in the memory circuits 93 and 94 then the read out signals are recorded in the corresponding first and second divided master tape recording devices 97 and 98, accordingly, the divided master tapes are produced efficiently. Although, in this embodiment, the signal is divided by changing addresses at the reading of the memory circuits 93 and 94, it is possible to constitute a system as such that signals in the respective channels are read out continuously by changing addresses at the time of writing.

Although it is possible to temporarily suspend the playback of the original master "M" tape at a time when the writing to the whole areas of the memory circuits 93 and 94 completes, a new signal may be written in an address the content of which has been read out without suspending the reproduction of the original master tape "M", by suitably setting a time difference between the write and the read according to capacities of the memory circuits 93 and 94.

For the intermittent driving of the first and second divided master tape recording devices 97 and 98, the playback/recording control device 105 may be constructed as such that the recording position is exactly controlled by rewinding a predetermined amount of the tape right after the recording is stopped, starting the tape running at a time when the recording instruction 102a is supplied from the read control device 102, returning a read enable signal at a predetermined timing by monitoring a tape running control signal prerecorded on the divided master tape, and start reading of the memory circuits 93 and 94 in response to the read enable signal.

Figure 8:
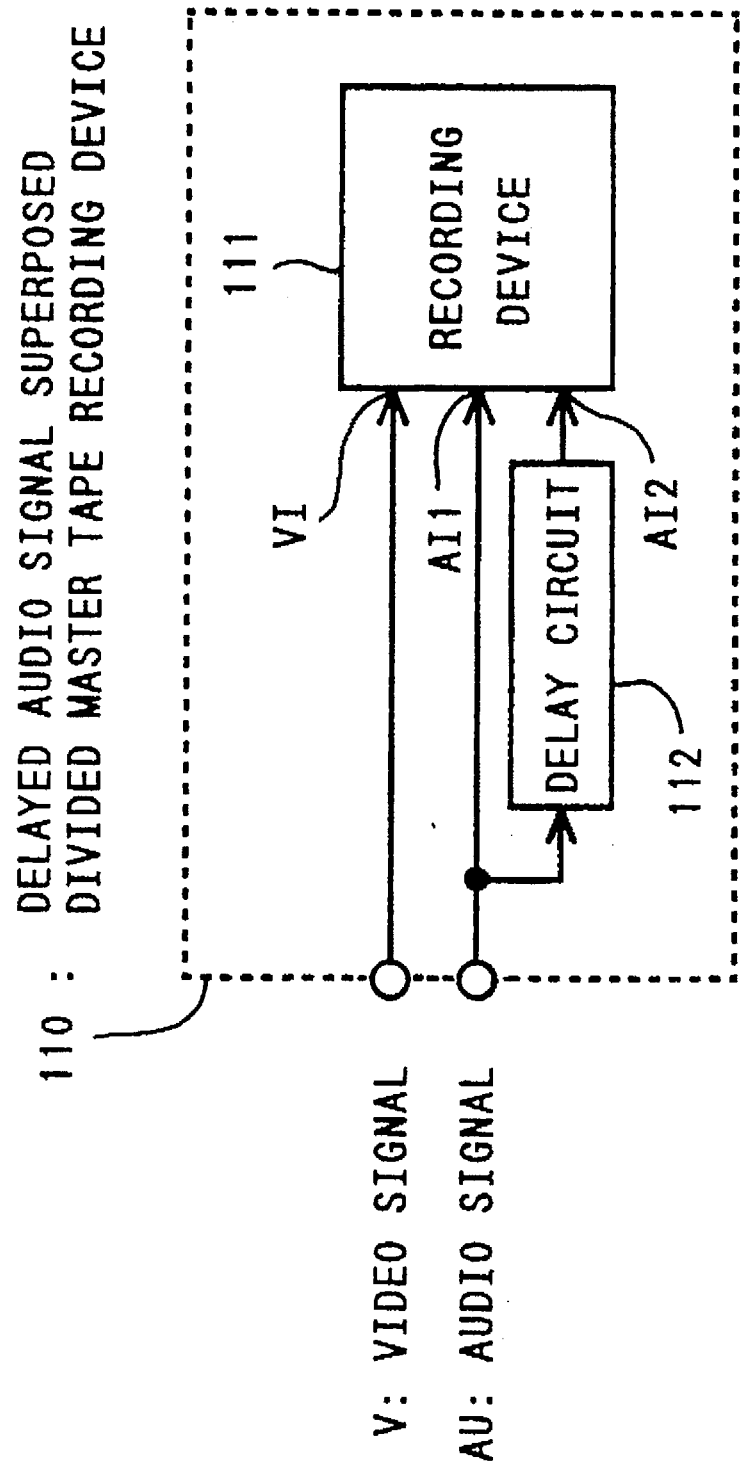
FIG. 8 is a block diagram of a recording device for producing a delayed audio-signal-superimposed divided master tape, which may be used on the embodiments of the present invention shown in FIGS. 5 through 7.

FIG. 8 is a block circuit diagram of a recording device for producing a delayed audio signal superposed divided master tape according to the present invention.

A delayed audio signal superposed divided master tape recording device 110 is a modified version of the first and second divided master tape recording devices 32, 33, 97 or 98 shown in FIGS. 5–7 with portions thereof modified. The delayed audio signal superimposed/divided master tape recording device 110 comprises a recording device 111 having 2 separate audio signal recording input terminals AI1 and AI2 and a delay circuit 112.

A video signal "V" is supplied to a video signal recording input terminal VI of the recording device 111, an audio signal "AU" is supplied to the recording device 111 to its audio input terminal AI1 directly and to its audio input terminal AI2 through the delay circuit 112, respectively.

Accordingly, two kinds of audio signals are recorded on a divided master tape by using this divided master tape recording device 110, one being with a delay and the other without the delay.

Figure 9:
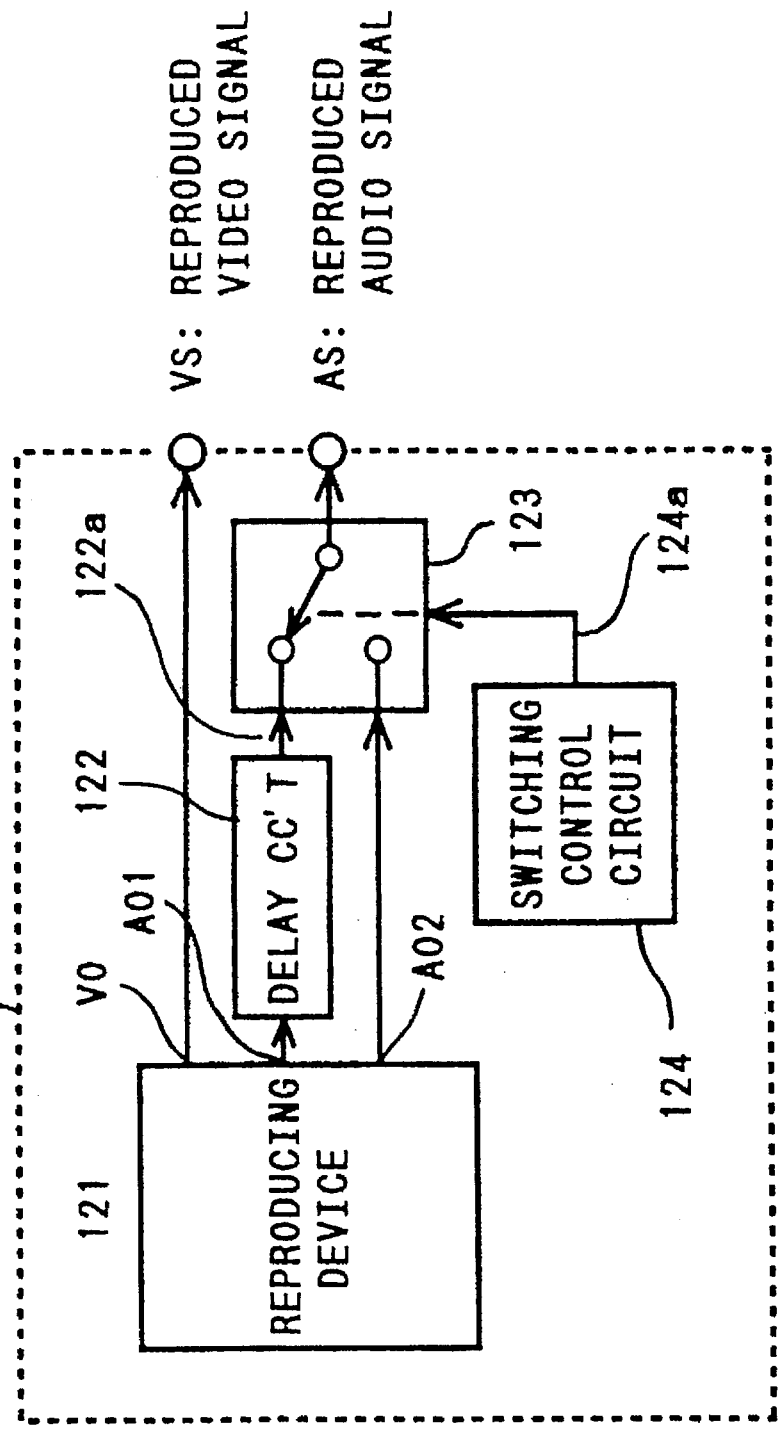
FIG. 9 is a block diagram of a playback device for playing back a delayed audio-signal-superimposed divided master tape, which may be used on the first embodiment of the present invention shown in FIG. 1.

FIG. 9 is a block diagram of a delayed audio signal superposed and divided master tape reproducing apparatus according to the present invention.

The delayed audio signal superposed and divided master tape reproducing apparatus 120 shown in FIG. 9 has a similar construction to that shown in FIG. 1, with some modifications of the first and second divided master tape reproducing devices 1 and 2.

The delayed audio signal superposed and divided master tape reproducing apparatus 120 comprises a reproducing, device 121 having two channel signal reproducing output terminals AO1 and AO2, a delay circuit 122 for delaying an audio signal reproduced without delay and supplied from the output terminal AO1, a switching circuit 123 for switching between an audio signal 122a delayed by the delay circuit 122 and an audio signal recorded with delay and supplied from the output terminal AO2 and a switching control circuit 124 for controlling a switching operation of the switching circuit 123.

A delay time of this delay circuit 122 is same as that of the delay circuit 112 provided within the delayed audio signal superposed and divided master tape reproducing apparatus 110.

A reproduced video signal VS from the video signal output terminal VO is supplied directly to the double speed recording signal producing device 3 shown in FIG. 1 and the reproduced audio signal AS from the switching circuit 123 is supplied to the device 3.

The switching control circuit 124 controls the switching between two kinds of audio signal by supplying a switching control signal 124a to the switching circuit 123 at a preset timing so as not cause a loss of audio signal in the fade-in and fade-out switching process discussed later.

The switching timing is selected such that it is synchronous with an editing interval during production of the divided master tapes.

In a case where the divided master tapes carry control signals related to tape running positions, the apparatus may be constituted as such that it determines editing positions according to the control signal, to produce the switching control signal 124a.

FIGS. 10(a) through 10(h) show a series of time charts of an operation of the audio signal switching circuit.

FIG. 10(a) illustrates a signal processing operation of fade-in and fade-out at the editing points.

FIG. 10(b) shows an audio signal to be recorded on the audio signal superposed and divided master tape, where the audio signal is not delayed, and FIG. 10(c) shows another audio signal to be recorded on the audio signal superposed and divided master tape, where above another audio signal is delayed by the delay circuit 112, and Td is a delay time of the delay circuit.

FIGS. 10(d) and 10(e) show reproduced audio signals obtained at the output terminals AO1 and AO2 of the reproducing apparatus 121 and FIG. 10(f) shows the signal 122a delayed by the delay circuit 122.

FIG. 10(g) illustrates the switching control signal 124a for selecting either one of the signals shown in FIGS. 10(e) and 10(f) as the audio signal output AS and FIG. 10(h) shows the audio signal output AS composed by the switching.

Figure 10:
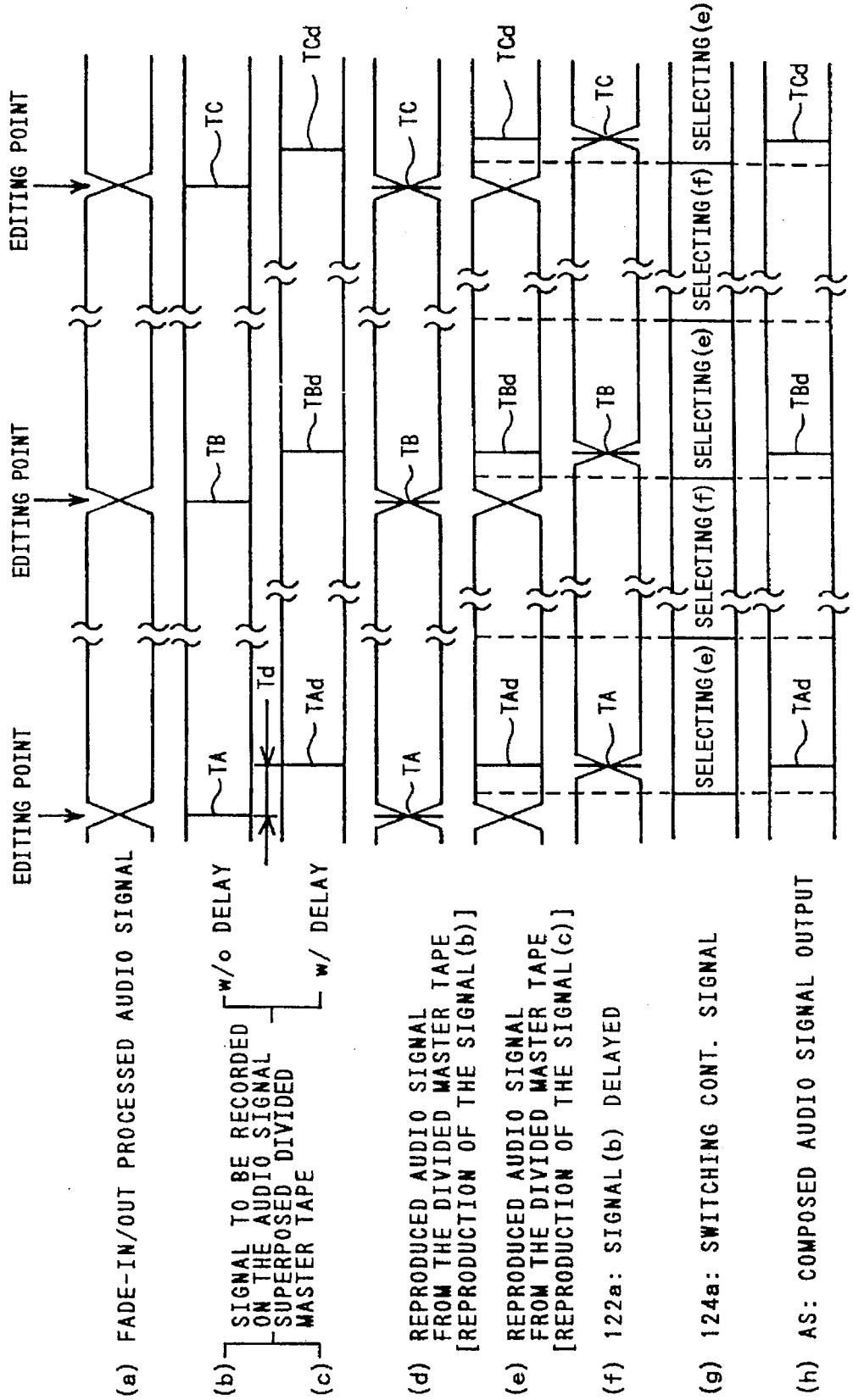
FIG. 10 is a series of time charts showing an operation of a playback device for playing back a delayed audio-signal-superimposed divided master tape, according to the present invention.

It is possible to obtain a continuous audio signal having no loss by delaying, when reproduced, the audio signal which was recorded without delay to coincide it with the audio signal recorded with delay as shown in FIGS. 10 (e) and 10(f), and switching between them by the switching circuit 123 as such that the fade-in and fade-out portions thereof are excluded.

Similarly, it is possible to reproduce an audio multiplexed stereo signal etc., when the divided master recording device and the reproducing device respectively have 4 channels or more.

Although, in this embodiment, the original master tape is divided to two divided master tapes, it is possible to perform a dubbing at a speed 3 or more times the real time speed by increasing the dividing number of the tape up to 3 or more and converting its bit rate 3 or more times the real time bit rate.

Second Embodiment

Next, the second embodiment of the present invention will be described with reference to FIG. 11 to FIG. 14(e).

Figure 11:
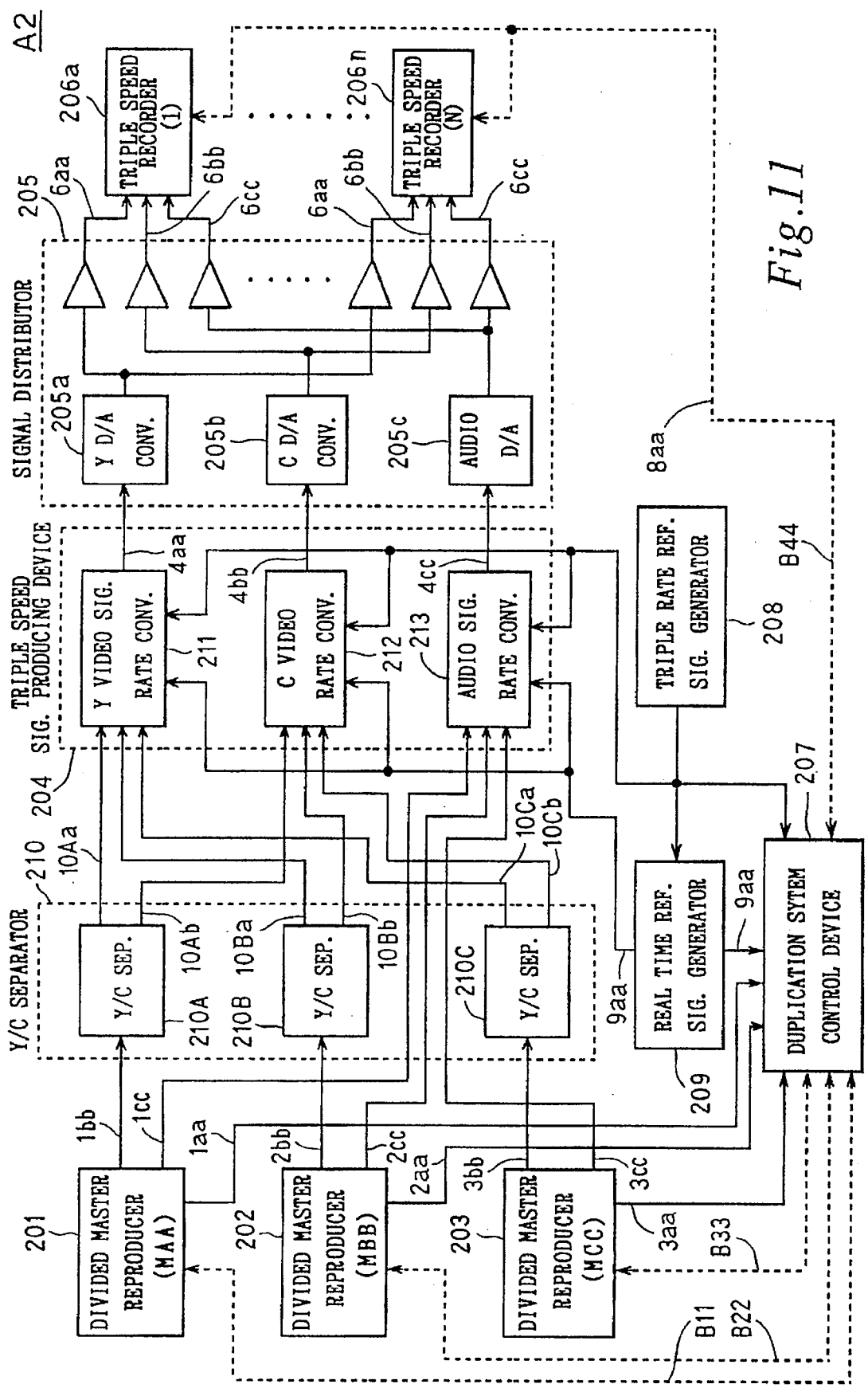
FIG. 11 is a block diagram of a triple speed dubbing apparatus according to a second embodiment of the present invention.
Figure 13:
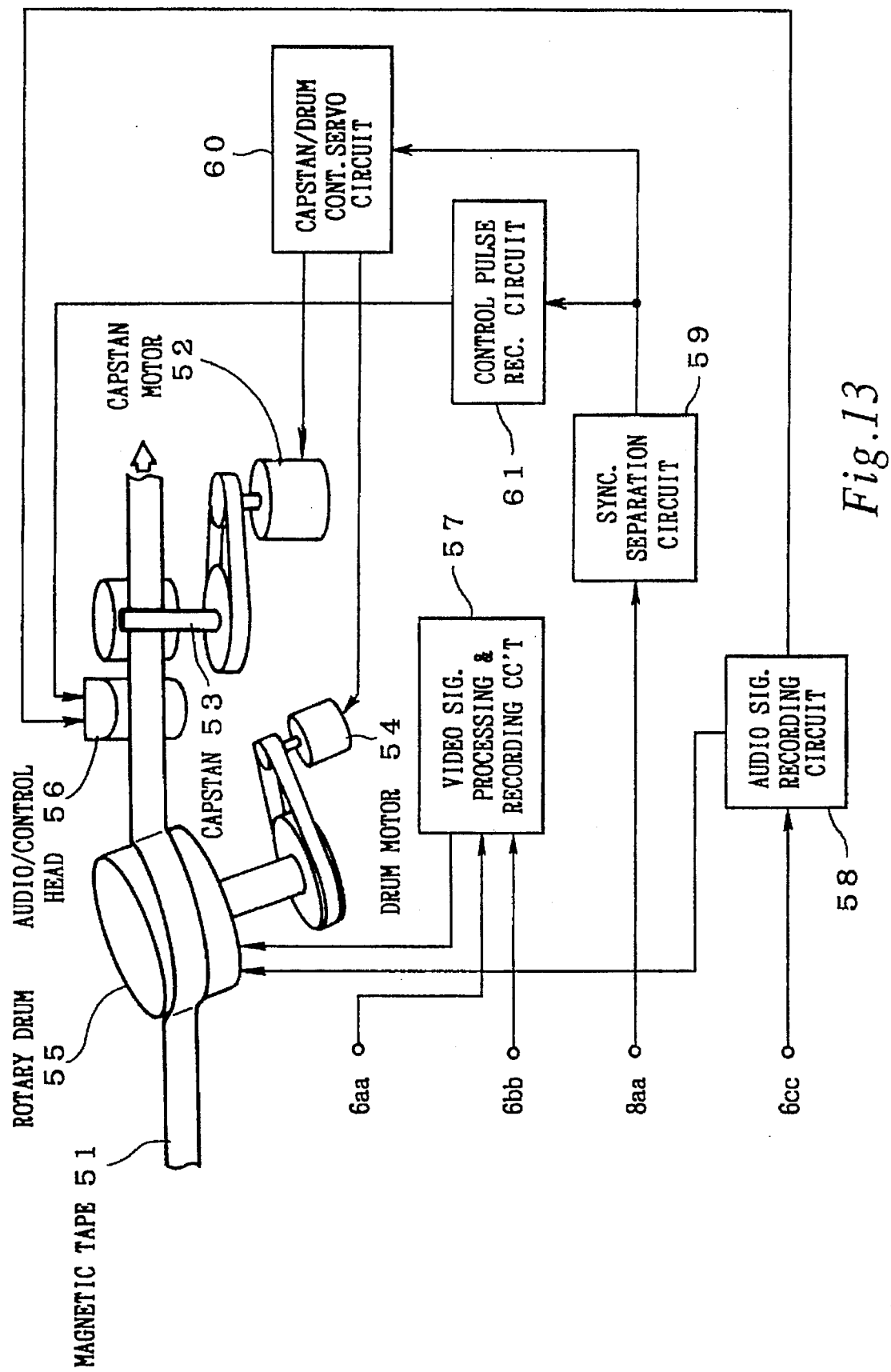
FIG. 13 is a block diagram of a triple speed tape recording device used on the second embodiment of the present invention.

FIG. 11 shows a block diagram of a triple speed dubbing apparatus according to the second embodiment of the present invention. FIGS. 12(a) through 12(c) illustrate a recorded content of 3 divided master tapes to be used in the apparatus in FIG. 11. FIG. 13 is a block diagram of a triple speed recording device used on the second embodiment of the present invention. FIGS. 14(a) through 14(e) show signal configurations and producing process of a triple speed recording signal according to the second embodiment of the present invention.

The triple speed dubbing apparatus "A2" is to perform a dubbing of magnetic tapes to be used on VTRs and recorded with video and audio signals.

The triple speed dubbing apparatus "A2" comprises first to third divided master tape reproducers 201, 202 and 203, a Y/C (luminance signal/chroma signal) separator 210, a triple speed signal producing device 204, a signal distributor 205, one or a plurality of triple speed recorders (slave tape recorders) 206a . . . 206n, a duplication system control device 207, a triple rate reference signal generator 208, and a real time reference signal generator 209.

FIGS. 12(a) to 12(c) respectively indicate contents recorded on three 1st to 3rd divided master tapes "MAA", "MBB" and "MCC" to be played back by first to third divided master tape reproducers 201, 202 and 203 respectively. On the 1st divided master tape "MAA", video and audio signal segments corresponding to color frames (abbreviated as CF) 1, 4, 7, 10 . . . are recorded with a time code "1aa" as shown in FIG. 12(a). And on the 2nd divided master tape "MBB", video and audio signal segments corresponding to color frames (abbreviated as CF) 2, 5, 8, 11 . . . are recorded with a time code "2aa" as shown in FIG. 12(b). Similarly on the 3rd divided master tape "MCC", video and audio signal segments corresponding to color frames (abbreviated as CF) 3, 6, 9, 12 . . . are recorded with a time code "3aa" as shown in FIG. 12(c). Each of the video and audio signals recorded on First to third divided master tapes "MAA", "MBB" and "MCC" is originally in a form of single series of signal in the order of corresponding color frames 1, 2, 3, 4, 5, 6, 7, 8, 9, 10, 11, 12, . . . in time domain. However, the time codes "1aa", "2aa", "3aa" are recorded respectively to the three divided master tapes "MAA", "MBB" and "MCC", but they are timingwise identical each other that every 2 increments of the time code are assigned to 1 color frame CF as shown.

As shown in FIG. 11, the first divided master tape "MAA" is loaded into the first divided master tape reproducer 201, the second divided master tape "MBB" is loaded into the second divided master tape reproducer 202, and the third divided master tape "MCC" is loaded into the third divided master tape reproducer 203.

Triple rate reference signal generator 208 generates a triple rate video reference signal or a triple speed rate and timing control signal 8aa (hereinafter referred to as "control signal 8aa"). A real time reference signal generator 209 generates a real time speed and timing control 9aa (hereinafter referred to as "control signal 9aa") based on the control signal 8aa.

Duplication system control device 207 supplies, through reproducer control busses B11, B22 and B33, the control signal 9aa to the first to third divided master tape reproducers 201, 202 and 203 respectively. And monitoring time codes 1aa, 2aa and 3aa respectively outputted from the first to third divided master tape reproducers 201, 202 and 203, the control device 207 feeds driving information including the control signal 9aa to the divided master tape reproducers 201, 202 and 203 so as to control their tape reproduction speeds to be same real time speed and synchronized each other.

Further, this duplication system control device 207 supplies driving information including the control signal 8aa to first to Nth triple speed recorders 206a to 206n through the recorder control buss B44 so as to control their tape recording speeds to be the triple speed and synchronized each other.

Y/C separator 210 is comprised of first to third Y/C separation units 210A, 210B, 210C, which are respectively supplied with a real time speed video signal 1bb reproduced by the first divided master tape reproducer 201, a real time speed video signal 2bb reproduced by the second divided master tape reproducer 202 and a real time speed video signal 3bb reproduced by the third divided master tape reproducer 203, where "Y" and "C" signals of each of the real time speed video signals 1bb, 2bb, 3bb are separated each other to produce respective luminance signals of 10Aa, 10Ba, 10Ca and chroma signals of 10Ab, 10Bb, 10Cb.

The triple speed signal producing device 204 is comprised of a "Y" video signal bit rate converter 211, a "C" video signal bit rate converter 212 and an audio signal bit rate converter 213. The luminance signals 10Aa, 10Ba, and 10Ca are inputted to the "Y" video signal bit rate converter 211 and the chroma signals 10Ab, 10Bb 10Cb are inputted to the "C" video signal bit rate converter 212. The "Y" video signal bit rate converter 211 converts respective bit rates of the luminance signals 10Aa, 10Ba, and 10Ca into 3 times each of the originals and combine them to form a single series of triple speed rate luminance signal 4aa having the original color frame order of 1CF, 2CF, 3CF . . . of the original master tape "M" before it is divided to "MAA", "MBB" and "MCC". Similarly, the "C" video signal bit rate converter 212 converts respective bit rates of the chroma signals 10Ab, 10Bb, and 10Cb into 3 times each of the originals and combine them to form a single series of triple speed rate chroma signal 4bb having the original color frame order of 1CF, 2CF, 3CF . . . of the original master tape "M". Similarly in the audio signal bit rate converter 213, audio signals 1cc, 2cc and 3cc reproduced respectively from the divided master tape reproducers 201, 202 and 203 are converted in bit rate into 3 times the originals and combined to a single series of triple speed rate audio signal 4cc having the same signal stream order as that of the original.

When the video and audio signals reproduced respectively from the Y/C separator 210 and divided master tapes "MAA", "MBB", "MCC" are digital, each of the bit rate converters 211, 212, 213 is equipped with a signal processing circuit including a storage device of shift register or RAM and a controller to control thereof, and the signals are written in the storage device in synchronization with the control signal 9aa and read out in synchronization with the control signal 8aa.

On the other hand, when the video and audio signals reproduced respectively from the Y/C separator 210 and divided master tapes "MAA", "MBB", "MCC" are in an analog format, each of the bit rate converters 211, 212, 213 is equipped with an A/D converter for converting the analog input signal into a digital counterpart, which is in turn stored in the above storage device.

Signal distributor 205 is provided with D/A converters 205a, 205b, 205c and buffers as shown in FIG. 11. By these converters, the triple speed rate luminance, chroma and audio signals 4aa, 4bb, 4cc are converted into respective analog formats, and each of the triple speed rate luminance, chroma and audio signals 6aa, 6bb, 6cc in the analog format is supplied to the first to Nth triple speed recorders 206a to 206n through the buffers.

FIG. 13 is a block diagram of a triple speed recording device for producing video tapes of VHS system (an industry standard) format at 3 times the real time (standard) speed according to the second embodiment of the present invention.

The magnetic tape 51 duplicated (by dubbing the program of the master tape) as a slave tape at the triple speed, is transported by the capstan 53 driven by the capstan motor 52. As the magnetic tape 51 passes around a periphery of the rotary drum 55 driven by the drum motor 54, the triple speed rate luminance and chroma signals in the analog format are recorded on the magnetic tape 51 and the triple speed rate audio for a linear audio track and control signals are recorded on the same tape 51 by the audio/control head 56, thus recorded magnetic tape 51 is wound on an unshown take-up reel.

The video signal processing and recording circuit 57 receives the triple speed rate luminance and chroma signals 6aa and 6bb in the analog format and FM modulate the luminance signal 6aa and down-convert a spectrum of the chroma signal 6bb to a lower frequency range according to the VHS system standard, and combine them for recording thereof on the magnetic tape 51 through unshown recording amplifier and recording heads mounted on the rotary drum 55.

In the audio signal recording circuit 58, a left channel signal of the audio signal 6cc is FM-modulated into a 3×1.3 MHz FM signal, and a right channel signal of the audio signal 6cc is FM-modulated into a 3×1.7 MHz FM signal, which are then combined and recorded on the video tracks of the magnetic tape 51 through a recording amplifier and rotary FM-audio recording heads, both not shown, mounted on the rotary drum 55. According to the standard mentioned before, the combined FM-audio signal is first recorded on the magnetic tape 51, then the video signal (luminance and chroma) is recorded over the combined FM-audio signal previously recorded on the same track in this recording operation. On the other hand, the triple speed rate audio signal for the linear track is outputted from the audio signal recording circuit 58 and recorded on the linear track of the magnetic tape 51 through unshown linear audio recording amplifier and the audio/control head 56.

Triple speed rate control signal 8aa (triple rate video reference signal) is supplied to a sync separation circuit 59, by which a vertical sync signal is separated from the triple speed rate control signal 8aa, and is supplied to the capstan/drum control servo circuit 60 and the control pulse recording circuit 61.

The capstan/drum control servo circuit 60 drives and controls the drum motor 54 and the capstan motor 53 based on the separated vertical sync signal. Control is performed as such that when an NTSC video signal is recorded at the triple speed for instance, rotary drum 55 is controlled to rotate at 90 r.p.s. (30 r.p.s. for the real time recording), and the capstan 53 is controlled to transport the magnetic tape 51 at a speed of 10.005 cm/sec (3.335 cm/sec for the real time recording).

The control pulse recording circuit 61 generates a control pulse signal by wave-shaping the vertical sync signal fed from the sync separation circuit 59, and records the control pulse signal on the control track of the magnetic tape 51 through the audio/control head 56. Accordingly, based on the real time speed video and audio signals 1bb, 1cc, 2bb, 2cc, 3bb, 3cc reproduced respectively from the divided master tapes "MAA", "MBB", "MCC" by the divided master tape reproducers 201, 202 and 203, the triple speed signal producing device 204 produces triple speed recording signals 4aa, 4bb, 4cc as shown in FIG. 14(b), in which one of the Y, C and audio signals is represented. The triple speed recording signals 4aa, 4bb, 4cc are respectively converted into triple speed analog recording signals 6aa, 6bb, 6cc by the Y, C and audio D/A converters 205a, 205b, 205c, thus recorded on N-number of the magnetic tapes 51 at the triple speed by the triple speed recorders 206a through 206n.

With reference to FIGS. 14(a) through 14(e), description is now given to details of the triple speed recording signals, of their configurations divided in units of color frames and producing process in relation to the time codes "1aa", "2aa", "3aa". FIGS. 14(a), 14(c) and 14(d) show these time codes and the video or audio signal recorded on the respective divided master tapes "MAA", "MBB", "MCC", from which the triple speed recording signals for dubbing are produced. FIG. 14(b) shows a signal configuration of the triple speed recording signals of video or audio. FIG. 14(e) exemplary shows a triple speed dubbing timing chart with actual triple speed operation timings in brackets and a divided master tape recording chart, in which a signal content in relation to the recorded time code representative of each of the divided master tapes "MAA", "MBB", "MCC" is illustrated. A color bar signal is recorded in a first sector on the divided master tape defined between a start point "A" [$0^H$(hour):$58^M$(minutes):$00^S$(seconds):$00^F$(frame number of SMPTE time code)] at which recording of divided master tape starts, and a time code matching point "C" [$0^H$:$59^M$:$00^S$:$00^F$] at which the respective time codes on the divided master tapes "MAA", "MBB", "MCC" coincide timingwise each other after a preparatory running period "P" thereof as indicated in FIG. 14(e). A first black burst signal (black picture) "B.B" is recorded in a second sector of the divided master tape, which starts from the point "C" [$0^H$:$59^M$:$00^S$:$00^F$] and ends at a program start point "E" [$1^H$:$00^M$:$00^S$:$00^F$] followed by a program sector. Second black burst signal (black picture) "B.B" is recorded subsequent to an end of the program sector. In other words, the program sector of each of the divided master tapes is preceded by the first black burst signal "B.B" and succeeded by the second black burst signal "B.B". In the triple speed dubbing operation, a simultaneous playback of the divided master tapes "MAA", "MBB", "MCC" initiates at a playback start point "B" [$0^H$:$58^H$:$40^S$:$00^F$], and as the 3 divided master tapes run together in the preparatory running period "P", their individual running speed are so adjusted by the duplication system control device 207 that they become synchronized each other and their time codes coincide (same number) each other at the point "C" [$0^H$:$59^H$:$00^S$:$00^F$]. On the other hand, the triple speed tape dubbing (duplication) operation starts within the "B.B" i.e. a black burst signal period at a duplication start point "D" [$0^H$:$59^M$:$50^S$:$00^F$] Which is 10 seconds prior to the program start point "E". The tape dubbing operation is terminated at a duplication end point "F" which resides within a period of the second black burst signal "B.B". Each of the luminance signal 6aa, the chroma signal 6bb and the audio signal 6cc is composed as follows. From the point "C" and on, a progress of the time codes of all the 3 divided master tapes "MAA", "MBB", "MCC" is equal and synchronized, and corresponding to time codes [$0^H$:$59^M$:$00^S$:$01^F$] and [$0^H$:$59^M$:$00^S$:$02^F$], the real time speed video (luminance and chroma) and audio signals of 1bb, 1cc of 1CF (FIG. 14(a)) from the divided master tape reproducer 201, and the same of 2bb, 2cc of 2CF (FIG. 14(c)) from the divided master tape reproducer 202 and the same of 3bb, 3cc of 3CF (FIG. 14(d)) from the divided master tape reproducer 203 are simultaneously outputted, in turn, by the triple speed signal producing device 204 and the signal distributor 205, these signals are aligned in an original order of 1CF, 2CF and 3CF by relatively time-delaying thereof, thus converted into the triple speed analog recording signals 6aa, 6bb, 6cc. Accordingly, the triple speed analog recording signals 6aa, 6bb, 6cc aligned in an order of 1CF, 2CF, 3CF, 4CF and on as shown in FIG. 14(b), of which the transmission rate is 3 times the real time speed, are produced and duplicated on the magnetic (slave) tape 51 in this order at the triple speed.

The preparatory period "P" is determined in consideration of required system access and control times of the divided master tape reproducers 201, 202, 203 so as to synchronize their time codes and equalize their tape transportation speed before the program start point "E". The duplication start and end points "D" and "F" can be determined within respective first and second black burst signal period "B.B" depending on client's requirement. This provides a blank period between the duplication start point "D" and the program start point "E" which is 3 times the time period between the two points ending [$1^H:00^M:00^S:00^F$]. The color bar signal recorded between the points "A" and "C" is utilized for adjusting the video signals when reproduced from the divided master tape reproducers 201, 202, 203.

Although the embodiments described in the foregoing are directed to the dubbing at double and triple rated speeds, the dubbing speed can be increased to four or more times by increasing the number of the divided master tapes and their recording and reproducing devices by changing the dividing number of the original master signal accordingly.

Further, in the described embodiments, the signal is divided and combined every color frame, but it is possible to convert the bit rate every segment, every field, every frame or every two frames thereof.

Since the dubbing apparatus according to the present invention is equipped with the N (times) speed recording signal producing device in which reproduced signals in N channels are time compressed to 1/N, respectively, and sequences of the respective signals are restored to be same as that of the original master signal, it is possible to perform a dubbing at the N times speed by using N times speed recording devices.

Further, since the divided master tape producing apparatus according to the present invention divides a reproduced signal from the original master tape "M" at a predetermined time interval and supplies them to the respective master tape recording devices, it is possible to produce a plurality of divided master tapes by a single reproducing operation.

Figure 15:
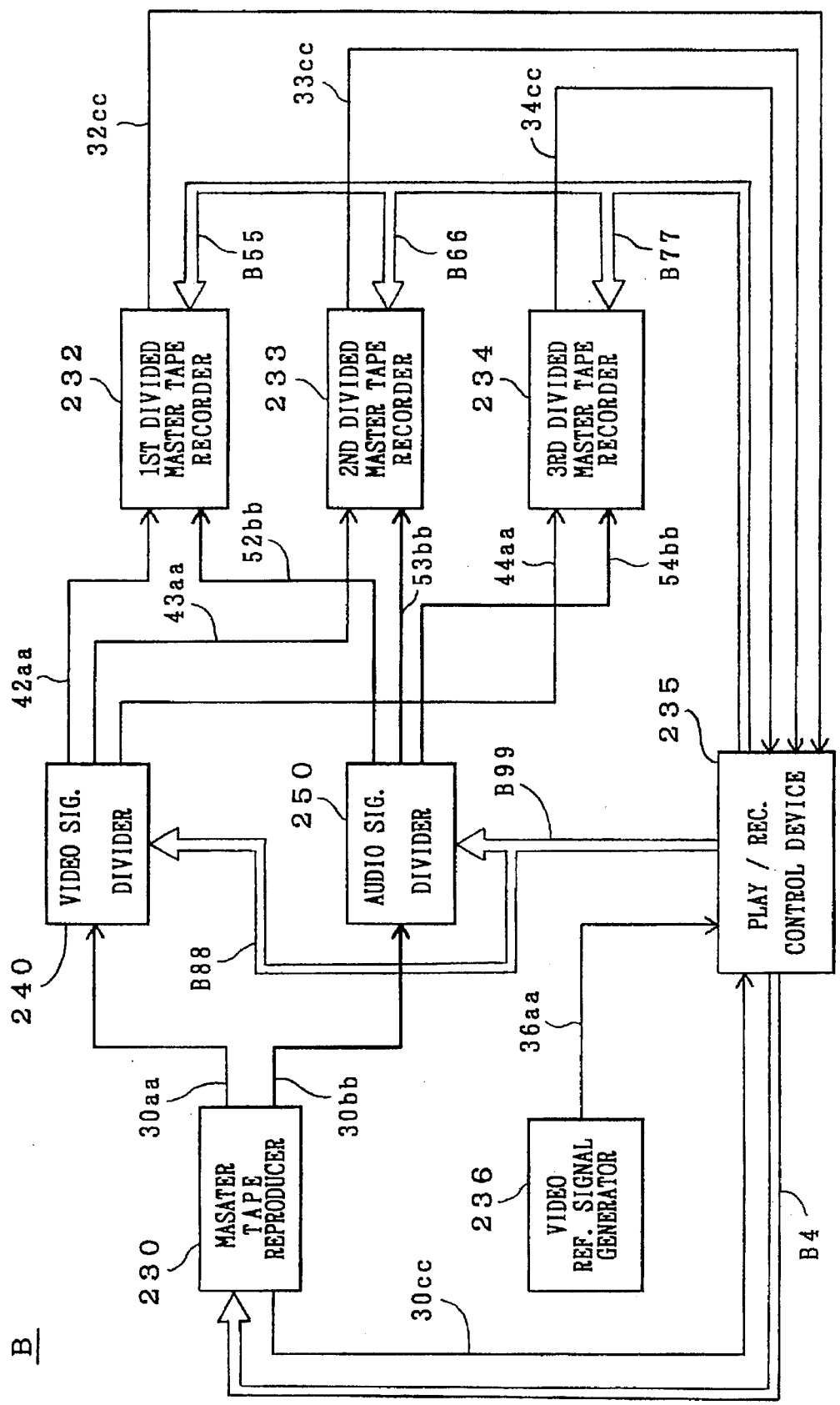
FIG. 15 is a block diagram of a divided master tape producing apparatus for producing divided master tapes used on the second embodiment of the present invention shown in FIGS. 11 and 13.

FIG. 15 is a block diagram of a divided master tape producing apparatus for producing divided master tapes used on the second embodiment of the present invention. With reference to FIG. 15, description will now be given to a divided master tape producing apparatus for producing the 3 divided master tapes "MAA", "MBB", "MCC" used in the triple speed dubbing apparatus shown in FIGS. 11 and 13. In FIG. 15, a numeral 230 denotes a master tape reproducer which plays at a real time speed the original master tape "M" recorded with original video (luminance and chroma) and audio signals together with time code, and outputs the original video signal 30aa and the original audio signal 30bb. For the master tape reproducer 230, a digital system VTR such as one in the "D2" or "D3" format is favorable because of its signal processing convenience, but an analog system VTR is still usable by A/D-converting its output. Numerals 232, 233, 234 denote respectively 1st to 3rd divided master tape recorders, 3 units of such identical units are needed for simultaneously producing the 3 divided master tapes "MAA", "MBB", "MCC". Each of the divided master tape recorders 232, 233, 234 intermittently transports a divided master tape loaded thereon at the real time speed with respect to the recorded signals, as video and audio signals intermittently (in a form of burst signal viewed from a divided master tape recorder) supplied thereto from a video signal divider 240 and a audio signal divider 250. Like for the master tape reproducer, a digital system VTR is favorable for the divided master tape recorder. In practice, a "D3" format VTR is used for the purpose. By the video signal divider 240, the original video signal 30aa is divided into a series of video signal segments which are aligned as 1CF, 2CF, 3CF, 4CF . . . and distributed in consecutive succession among 3 video signal chains 42aa, 43aa, 44aa shown in FIG. 15 in this order. Similarly, by the audio signal divider 250 the original audio signal 30bb is divided into a series of audio signal segments and distributed in consecutive succession among 3 audio signal chains 52bb, 53bb, 54bb shown in FIG. 15 in this order. Then these video and audio signal chains are assigned to first to third divided master tape recorders 232, 233, 234 as such that the video signal chain 42aa and the audio signal chain 52bb are to the first divided master tape recorder 232, the signal chains 43aa and 53bb to the second master tape recorder 233 and the signal chains 44aa and 54bb to the third master tape recorder 234 and recorded thereby on the 3 divided master tapes "MAA", "MBB", "MCC" respectively, a resultant distribution of the signal segments from this process can be seen in FIGS. 12(a) to 12 (c). Further details of the signal composition on the respective divided master tapes will be explained later with reference to FIGS. 16(a) to 16(d).

A playback/recording control device 235 controls a playback operation of the master tape reproducer 230 and a recording operation of the divided master tape recorders 232, 233, 234. The play/rec control device 235 supplies a video reference signal 36aa generated from a video reference signal generator 236 to the master tape reproducer 230 through the reproducing control bus B4, and when the master tape reproducer 230 is loaded with the original master tape "M" prerecorded with a time code 30cc, the control device 235 controls the master tape reproducer 230 to transport the loaded master tape "M" at a specified speed by monitoring the time code 30cc reproduced therefrom.

Further, through bus lines B88 and B99, the control device 235 controls "start" and "stop" operations of the video signal divider 240 and the audio signal divider 250, and controls output timings of the original video signal 30aa and the original audio signal 30bb so as to be divided into the previously explained video signal chains 42aa, 43aa, 44aa and the audio signal chains 52bb, 53bb, 54bb. Still further, through bus lines B55, B66 and B77, the control device 235 controls recording operations of the divided master tape recorders 232, 233, 234 supplying them with the video reference signal 36aa thereby the divided master tape recorders 232, 233, 234 transport and record the respectively loaded divided master tapes "MAA", "MBB", "MCC" intermittently according to the output timings of the original video signal 30aa and the original audio signal 30bb outputted respectively from the video signal divider 240 and the audio signal divider 250 which operate in the "start" and "stop" fashion as explained before. And when the divided master tapes "MAA", "MBB", "MCC" are in motion, their running speeds is an identical predetermined speed each other.

Figures 16A, 16B, 16C, 16D:
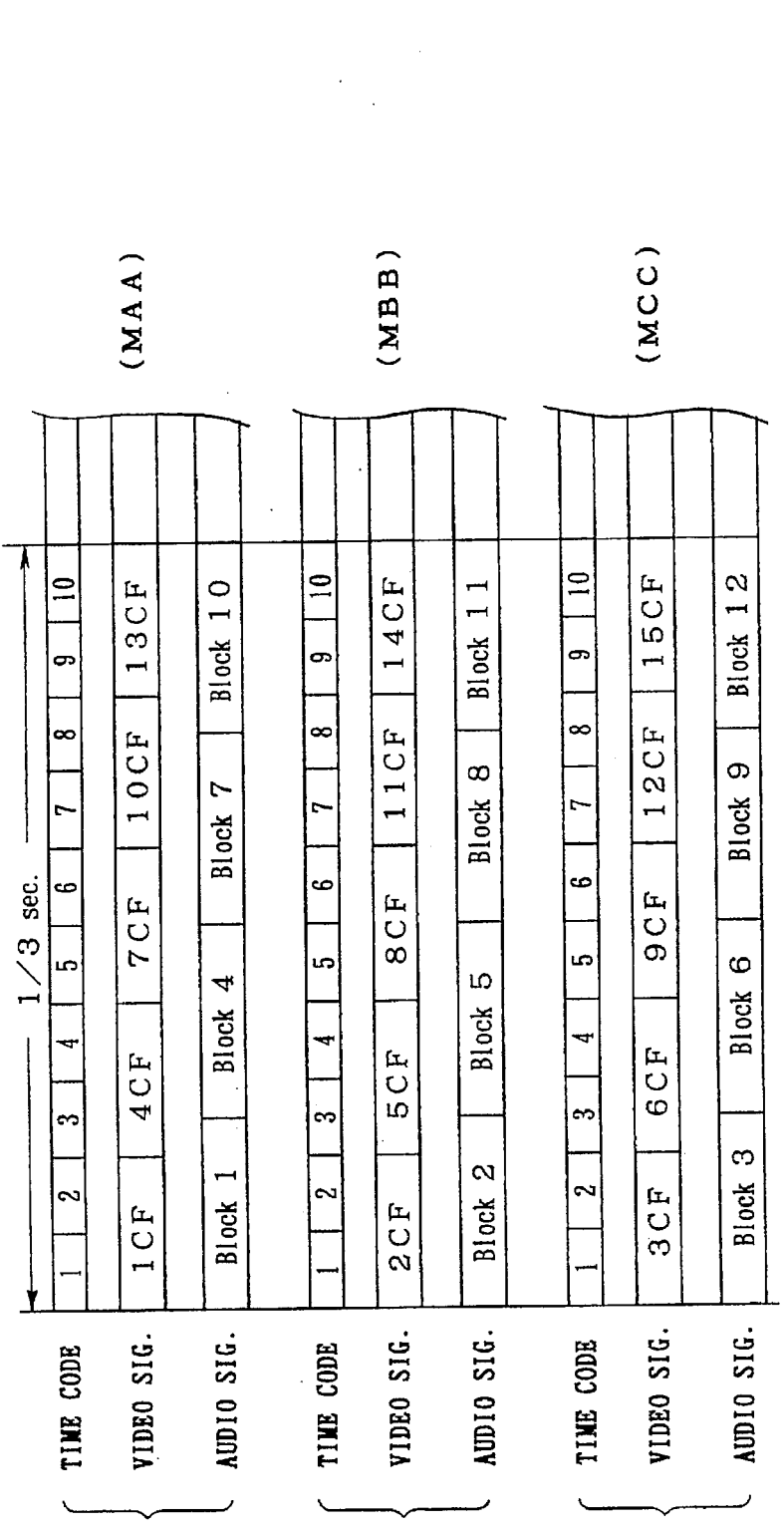
FIG. 16(a) shows original video and audio signals reproduced from the original master tape used in the second embodiment of the present invention.
FIGS. 16(b) through 16(d) show video and audio signals along with time codes recorded on the respective 3 divided master tapes for a triple speed dubbing apparatus of the second embodiment of the present invention.

FIGS. 16(a) shows the original video signal 30aa and the original audio signal 30bb referred to video field numbers, as reproduced from the master tape reproducer 230 upon playing the original master tape "M". FIGS. 16(b) to 16(d) show recorded signal contents including time codes on the respective divided master tapes for the triple speed duplication, signals and tapes identified therein are related to that in FIG. 15.

Referring to FIGS. 16(a), the original video signal 30aa is divided into data blocks each having a predetermined unit length "Vd" corresponding to one color frame CF as shown, and the original audio signal 30bb is divided into data blocks each having a predetermined unit length "Ad" which is longer than "Vd" by one field of the original video signal. Note that the "Vd" or the "Ad" is the shortest data unit of the video signal or the audio signal respectively. For cyclically allotting the original video and audio signals 30aa and 30bb to the 3 divided master tape recorders 232, 233, 234 in turn as explained before, switching of the signals by the video signal divider 240 occur every predetermined unit length "Vd" for the video signal 30aa, and every predetermined unit length "Ad" for the audio signal 30bb. Upon receiving the allotted signal, each of the 3 divided master tape recorders 232, 233, 234 records only the allotted signal segments on the divided master tape loaded thereto at its nominal speed so that this recording operation is intermittent for each master tape recorder. Thus the signal allotment is performed in the order of the recorders 232, 233, 234 and it returns to the recorder 232 repeating this order.

A series of operations explained above is controlled by the control device 235. In practice, data corresponding to a 9-sec length of the original video and audio signals 30aa and 30bb are processed and recorded at a time on the divided master tapes "MAA", "MBB", "MCC" respectively by the video and audio signal dividers 240 and 250 and the first to third divided master tape recorders 232, 233, 234 as such that the data are divided in the unit of CF and grouped to the video signal chains 42aa, 43aa, 44aa and the audio signal chains 52bb, 53bb, 54bb, each of which is 3-sec long which corresponds to 90 color frames and aligned in the order of 1CF, 4CF, 7CF, 10CF . . . for recording the divided master tape "MAA", and 2CF, 5CF, 8CF, 11CF . . . for the tape "MBB", and 3CF, 6CF, 9CF, 12CF . . . for the tape "MCC", so that the "start" and "stop" recording operation of the recorders 232, 233, 234 take place every 3 seconds. In order to make this intermittent 3-seconds long recording for positional precision on the individual divided master tapes "MAA", "MBB", "MCC", and also at precise timing between these tapes, each of the tapes is subject to a preparatory running before every "start" of this 3-sec recording operation, like did for the beginning of the program, by rewinding the tape for a length corresponding to the preparatory running period. This frequent preparatory running operation may be provided in addition to the preparatory running period "P" explained before. In order to perform this operation, the 3 individual divided master tapes "MAA", "MBB", "MCC" are preliminary recorded with time codes and upon recording these master tapes, the those prerecorded time codes 32cc, 33cc, 34cc are reproduced from the recorders 232, 233, 234 and are monitored by the control device 235 to control the operation of the recorders 232, 233, 234.

By repeating the 3-sec recording operation explained above, the 3 divided master tapes "MAA", "MBB", "MCC" recorded with contents as illustrated respectively in FIGS. 16(b) to 16(d) are produced. Note that on each of these divided master tapes, both of the recorded video and audio signals are contiguously aligned but not continuous programwise if referred to their original forms on the original master tape "M".

When the original video signal 30aa is divided into 1st to "n"th segments (1,2,3 . . . n) on the original master tape "M", and the divided signal segments are assigned to 1st to Nth divided master tapes, the divided signal segments are aligned on the 3 divided master tapes as:

1+N(n−1) on the 1st divided master tape "MAA",
2+N(n−1) on the 2nd divided master tape "MBB",
3+N(n−1) on the 3rd divided master tape "MCC", and
N+N(n−1) on the Nth divided master tape, where
N=1,2,3 . . . N, and n=1,2,3 . . . n.

When N=3, above distribution becomes:
1+3(n−1) on the 1st divided master tape "MAA",
2+3(n−1) on the 1st divided master tape "MBB", and
3+3(n−1) on the 3rd divided master tape "MCC".

As a minimum unit for the divided signal segments, data of 1 video frame or field, 1 color frame, or a group including a plurality of these may be adopted. And in this second embodiment 1 color frame is employed.

In case of the audio signals, the unit may be matched to one or more divided signal segments of video signal excepting an audio data length equal to 1 color frame or 1 frame of video signal, since such length can not be synchronized directly with the above 1 color fame nor 1 frame of video signal because of the audio signals' sampling frequency.

In this second embodiment, an audio data amount of 4004 words which corresponds to 5 fields of video signal, is made to one unit of audio signals because of the known fact that the audio data divided into the length equal to a plurality of video fields can be synchronized with the above divided video signal.

As shown in FIGS. 15 and 16(a) to 16(d), when one unit of divided master tape recorder produces one divided master tape to be recorded simultaneously with both the video and audio signals, the unit data length of each of the original video and audio signals 30aa and 30bb is so selected that a total data length for one complete recording program becomes an integral multiple of the above unit data length and also a multiple of the number of divided master tapes i.e. "3" in this second embodiment. The selection of the unit data length as such makes the recording of divided master tapes extremely efficient. For instance, by selecting the unit data length of the original video signal to be 1 color-frame-length (4 fields) and the same of the original audio signal to be 5 video-fields-length, the divided video signal segments of 15 color frames together with the divided audio signal segments of 12 data blocks can be arranged juxtaposed in timing scale exactly within 1 second as shown in FIG. 16(a), since 60 fields of the original video signal make up 1 second. And thus divided video and audio signal segments can be assigned to 3 divided master tapes in consecutive succession. As a result, in FIG. 16(b), a chain of the video signal (data) segments of 1CF, 4CF, 7CF, 10CF and 13CF becomes equal in length to a chain of the audio data blocks 1, 4, 7 and 10, similarly in FIG. 16(c), a chain of the video signal (data) segments of 2CF, 5CF, 8CF, 11CF and 14CF becomes equal in length to a chain of the audio data blocks 2, 5, 8, and 11, also in FIG. 16(d) a chain of the video signal (data) segments of 3CF, 6CF, 9CF, 12CF and 15CF becomes equal in length to a chain of the audio data blocks 3, 6, 9, and 12. Accordingly, this arrangement makes it possible to record 3 pairs of video and audio data segments as shown on the 3 divided master tapes simultaneously in 1/3 of second and this recording process can be repeated for the entire length of the program on the original master tape MAA. In actual production, 9 second-length of the original program is stored at a time and the data of the 9 second-length are recorded on the 3 divided master tapes MAA, MBB, MCC which run together for 3 seconds at a time. In other words, a video signal data amount corresponding to 45 color frames is continuously recorded on each of the 3 divided master tapes at one intermittent run (run time) thereof. In this connection, if one desires to prolong the continuous run of each divided master tape for stable recording and picture quality thereof, 3 times the above run time should be considered for the data storage and process of the original master tape program. For example, the run time of 1 second requires 3 seconds of master tape data to be stored and processed, the run time of K seconds requires 3K seconds of the same.

Figure 17:
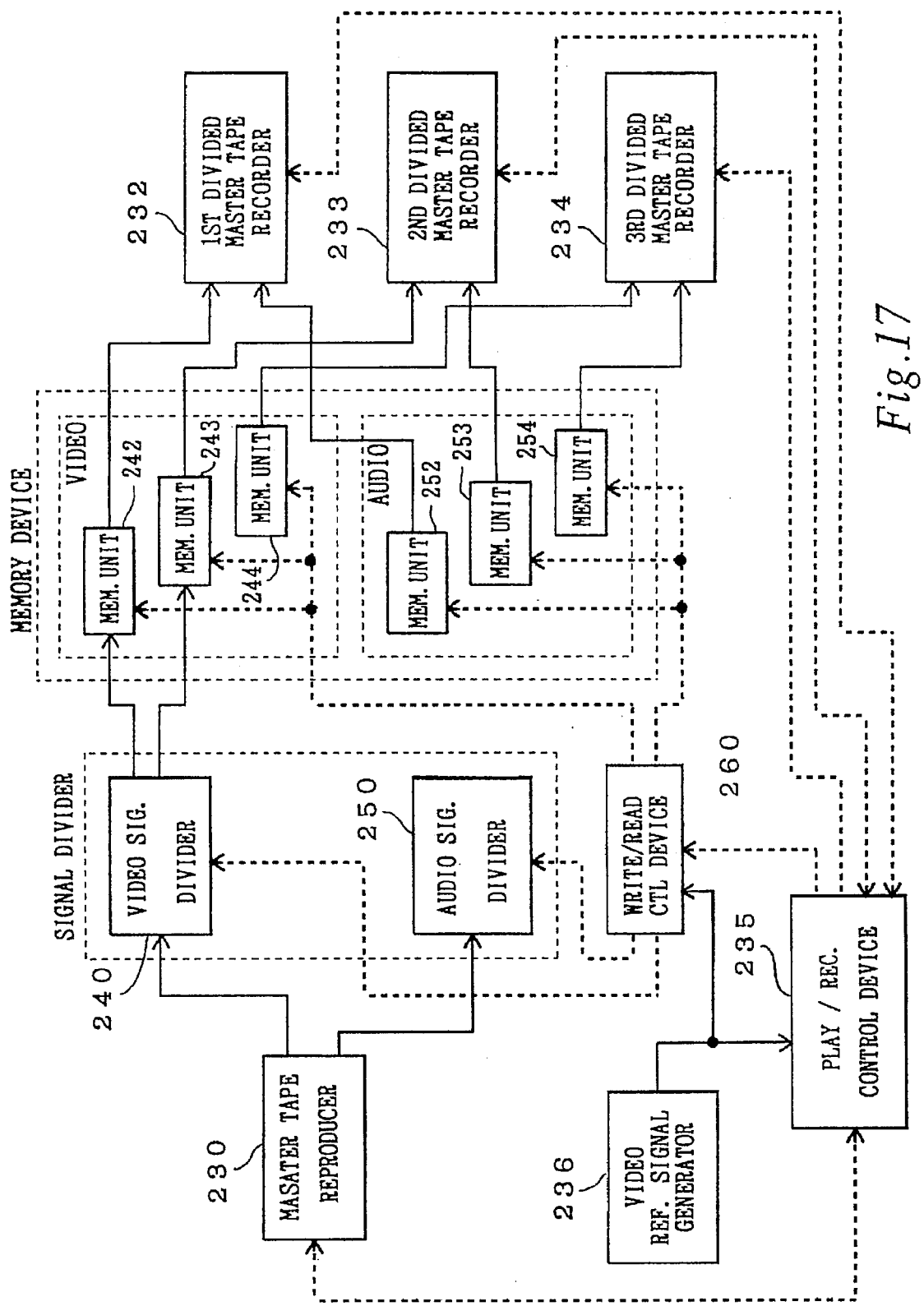
FIG. 17 is a block diagram of another divided master tape producing apparatus for producing divided master tapes used on the second embodiment of the present invention shown in FIGS. 11 and 13.

Accordingly, in order to record a prolonged amount of data in a single process, a divided master tape producing apparatus as shown in FIG. 17 may be used.

FIG. 17 shows a block diagram of another divided master tape producing apparatus for producing divided master tapes use don the second embodiment of the present invention. The apparatus in FIG. 17 utilizes memories for signal division, the master tape reproducer and the divided master tape recorders are same as those of FIG. 15. In FIG. 17, the video signal divider 240 is succeeded by 3 sets of memory units 242, 243, 244 correspondingly with the 3 divided master tape recorders 232, 233, 234, similarly, the audio signal divider 250 is succeeded by 3 sets of memory units 252, 253, 254 as shown.

According to the signal dividing rule as explained previously, the original video and audio signals 30aa and 30bb are divided and assigned respectively to the memory units 242, 243, 244 and the memory units 252, 253, 254 by the the video signal divider 240 and the audio signal divider 250. As controlled by a write/read control device 260, the video and audio data thus divided are memorized in succession into above memory units in the order shown as FIGS. 16(b), 16(c) and 16(d), and when the stored data amounts reach to certain levels, the stored data are read out and fed to the respective divided master tape recorder for recording.

In this arrangement, control and operation of the master tape reproducer 230 are made simpler to run continuously i.e. without stopping the original master tape "M" for stable reproduction, by providing a time difference between the writing and the reading in and out of the memory units 242, 243, 244, 252, 253, 254, and controlling memory operation that new data are written into the addresses of data which are just read out. And, since the unit for signal division is made to few fields of the video signal, the respective capacities of the memory units are limited to keep their cost low.

Optimum dubbing speed and advantages of the present invention

Optimum dubbing Speed

According to the present invention, the dubbing speed may be selected to any integer which is equal to the number of divided master tapes. For example, if the number of the divided master tapes is 2, 3, 4, 5 . . . the dubbing speed can be 2, 3, 4, 5 . . . times. In view of production efficiency, the faster the better, however there are certain limitations in those higher dubbing speed systems as follows.

1) Since any of these systems require expensive professional type digital VTRs, the investment for the total dubbing facility would become quite high as the number of such VTRs increases with the dubbing speed increase.

2) The faster the dubbing speed the more digital signal processing speed being required, in this regard, an availability of CPU, of which the signal processing speed is high enough to meet the requirement, and the access speed to memories and other devices must be concerned.

3) Degradation of head-to-tape contact intimacy and of skew distortion as the rotational speed of head-drum on the slave tape recorder in the dubbing system, increases. These problems cause picture quality degradation on dubbed tapes.

Considering above factors, N=3 i.e. the triple speed dubbing is considered optimum.

Advantages

1) Since the signals processed in the system are all digital up to the slave tape recorder input, no signal degradation thus high quality dubbing operation is assured. Note that the luminance signal "Y" and the chroma signal "C" of the video signal are individually processed in the system, which additionally contributes to the high quality pictures.

2) Less Development Labor and Cost

Conventional digital VTRs are utilizable for both the original master tape reproducer and the divided master tape recorders without much modification of the VTRs since they run at the standard running speed in the system of present invention.

3) The above VTRs are not burdened as the tapes are reproduced or recorded by them at the VTR's standard speed.

4) Less memory devices are required thus low in cost, since the unit of data division is made to one color frame.

5) Signal processing inherent to the audio signal such as fade-in and fade-out at editing points, can be handled without modifying the divided master tape recorders.

Regarding the video tape recorder utilizable for the 1st to 3rd divided master tape recorders 232, 233, 234 as shown in FIG. 15, there are some recorders which have an automatic function of fading-in, taking few milliseconds, the audio signal upon starting its recording, and fading-out, taking few milliseconds, the same upon terminating the recording. Reason for the provision of these fade-in and fade-out functions is considered to be preventing an abrupt data signal switching which may otherwise confuse its reproduction system.

However, this can be a problem in the divided master tape production in the present invention, where recording is made intermittently. When the audio signal 30bb is recorded in consecutive sequence as its data blocks are aligned as shown in FIGS. 16(b) through 16(d), some of the audio data blocks may be subject to dropouts (lost data) due to the above fade-in and fade-out functions which are associated with the "start" and "stop" recording operation of the VTR. And the divided master tapes MAA, MBB and MCC are produced accordingly. If such divided master tapes MAA, MBB and MCC including the dropouts were used for the triple speed dubbing system of the present invention, the original audio signal would not be restored on the slave tapes, but it would become intermittent due to the dropouts included in the series of audio signal data eventually recorded on the slave tapes.

On the other hand, it would be quite expensive to modify the divided master tape recorders 232, 233, 234 in order to remove their fade-in/out functions. Therefore, in the present invention, the audio system in the high speed dubbing system and the divided master tape producing system, is improved to restore the original audio signal by interpolation. Details of the improvement of audio system will now be explained with reference to FIGS. 18 through 22.

Figure 18:
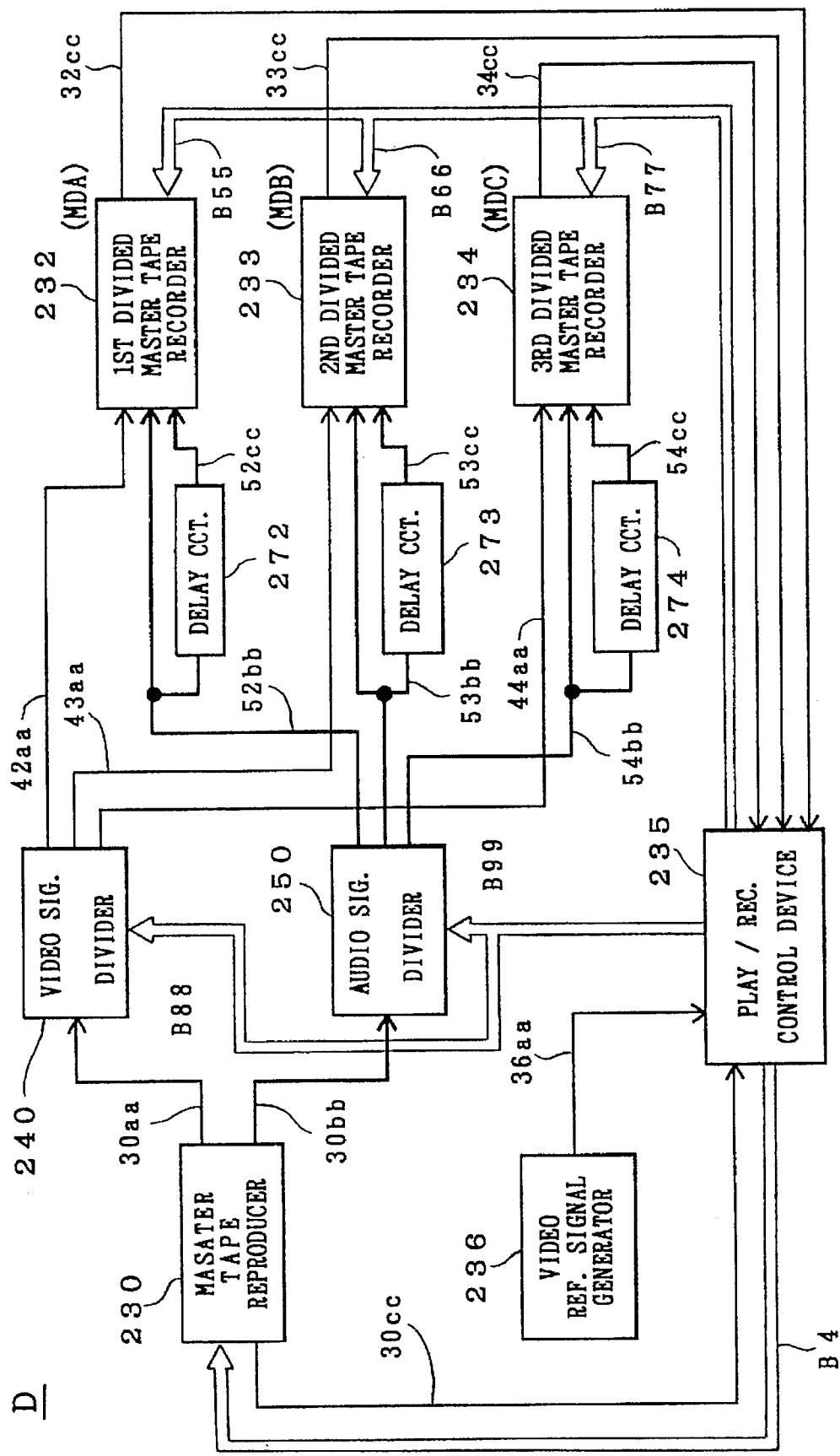
FIG. 18 is a block diagram of improved divided master tape producing apparatus for producing divided master tapes used on the second embodiment of the present invention shown in FIGS. 11 and 13.

FIG. 18 shows a block diagram of the improved divided mater tape producing apparatus, which is a modified version of the apparatus shown in FIG. 15.

Figure 19:
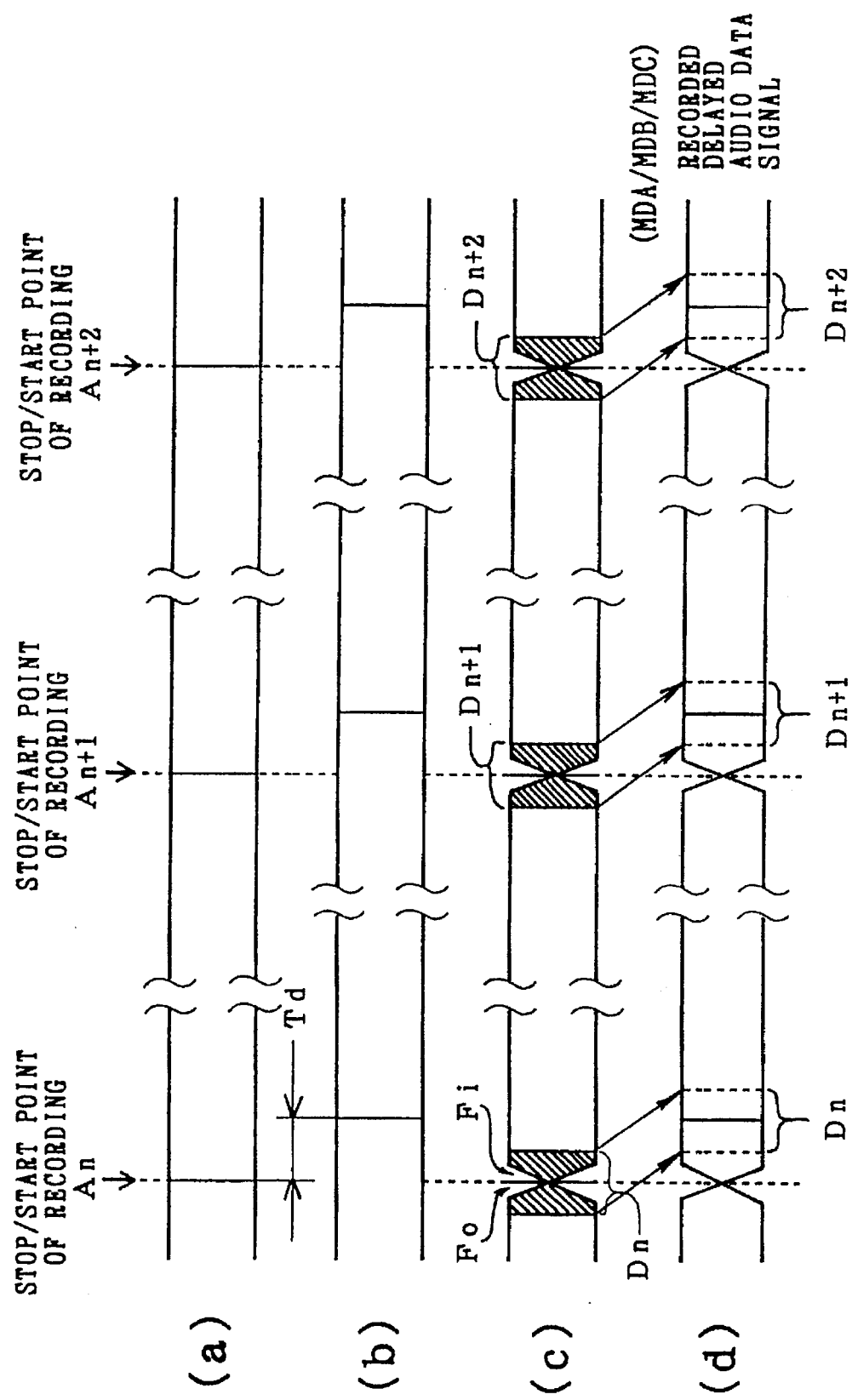
FIG. 19 illustrates various statuses of audio data strings referred to in the explanation of audio data signal processings in the improved divided master tape producing apparatus shown in FIG. 18.

In the improved divided master tape producing apparatus "D" shown in FIG. 18, the 1st to 3rd divided mater tape recorders 232, 233, 234 are preceded respectively by delay circuits 272, 273, 274 in their respective audio chains. And the audio signal chains 52bb, 53bb, 54bb extending from the audio signal divider 250 to the 1st to 3rd divided mater tape recorders 232, 233, 234, are branched out respectively to the delay circuits 272, 273, 274 in which the audio data are subjected to a predetermined delay time, thus delayed audio data are fed respectively to the 1st to 3rd divided mater tape recorders 232, 233, 234, through audio chains 52cc, 53cc, 54cc as shown. Accordingly, the 1st divided mater tape recorder 232 records the audio data fed through both the audio chains 52bb and 52cc on a divided mater tape MDA at a same timing. The same is true to the 2nd and 3rd divided mater tape recorders 233 and 234. Otherwise, the the improved divided master tape producing apparatus "D" is same in construction as the apparatus shown in FIG. 15. By empolying a memory device (RAM) on the delay circuits 272, 273, 274, and controlling their read and write timings, a precision delay process is performed therein. And further by controlling addresses for the read and write operation, data left out from read out within a predetermined time period due to the delay, remain stored in the delay circuit and connected to subsequently written data then read out together. Resulted audio data string recorded on one of the divided master tapes MDA, MDB, MDC is shown in FIG. 19. The video signal processings in this improved divided mater tape producing apparatus "D" remain unchanged thus explanation thereof is omitted.

FIG. 19 conceptually illustrates various statuses of audio data string referred to in the explanation of audio data signal processings in the improved divided master tape producing apparatus.

FIG. 19(a) shows the audio data signal supplied (distributed) from the audio signal divider 250 to one of the divided master tape recorders as a series of divided audio data signal. As an example, explanation is now given to operation of the 1st divided master tape recorder 232. In FIG. 19(a), An, An+1, An+2 indicate points on the above series of divided audio data signal, where the divided master tape recorder 232 performs "stop" and "start" (resume) recording operations as intermittent recording. Note that as the tape being recorded stands still after the "stop" until the subsequent "start" of recording, the end of preceding recorded portion becomes physically contiguous to the beginning of succeeding recorded portion. Therefore, no physical "blank" is created on the divided master tape, thus not shown in the figure, although the original program of the audio signal is noncontinuous on the divided master tape as it is distributed between the 3 divided master tapes.

As explained before, the audio data interposed between such as points An and An+1 may be either one data divisional unit or a group of divided data units corresponding to few seconds of audio program.

FIG. 19(b) shows the series of divided audio data signal shown as FIG. 19(a) being delayed by the delay circuit 272, where Td represents its delayed amount.

FIG. 19(c) shows a recorded form of the series of divided audio data signal shown in FIG. 19(a). This recording is actually made on one track of the divided master tape MDA.

FIG. 19(d) shows a recorded form of the series of divided audio data signal shown in FIG. 19(b). This recording is actually made on another track of the divided master tape MDA simultaneously with the recording of the signal of FIG. 19(a).

In other words, the above two series of divided audio data signals are recorded simultaneously but individually on different tracks of the same divided master tape MDA.

In FIG. 19(c) "Fo" indicates a data loss caused by the fade-out recording operation at the point An, which is inherent to the divided master tape recorder 232, and "Fi" indicates a data loss caused by the fade-in recording operation of the same recorder 232. This data loss is common to other points An+1 and An+2 as well as the series of recorded audio data signal of FIG. 19(d).

As can be seen in FIGS. 19(c) and 19(d), a portion Dn subjected substantially to the data loss in FIG. 19(c), is unimpaired in FIG. 19(d) due to the delay Td. The same is true to portions Dn+1 and Dn+2 as shown. It is desirable that a span of Dn is determined slightly longer than that of the data loss.

Similarly on each of the divided master tapes MBB and MCC, delayed and undelayed series of divided audio data signals, like shown in FIGS. 19(c) and 19(d), are recorded on its two different tracks.

Third Embodiment

Next, audio signal processing for the triple speed dubbing operation using the 3 divided master tapes MDA, MDB, MDC each recorded with the above mentioned delayed and undelayed series of divided audio data signals, will be explained.

Figure 20:
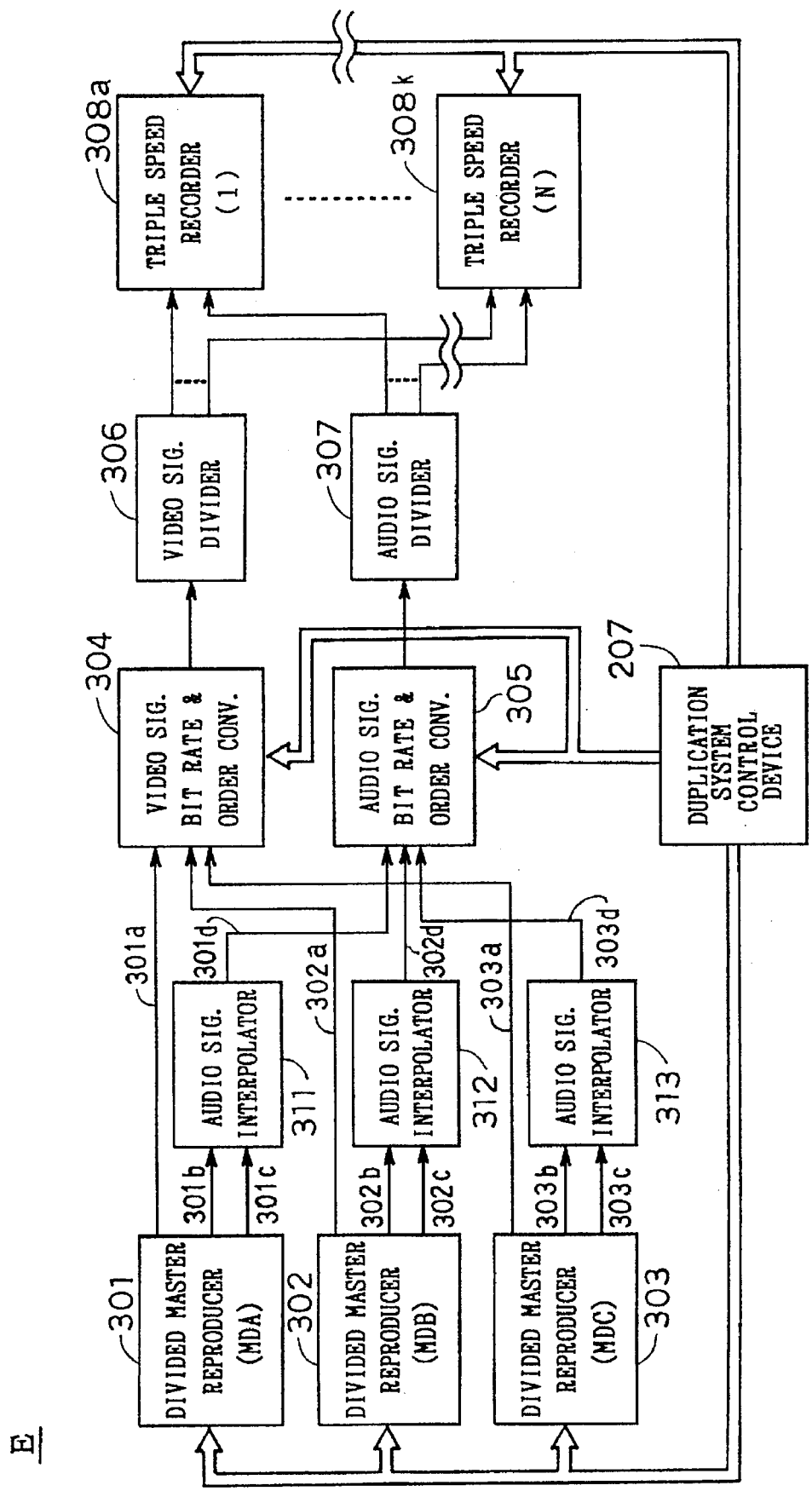
FIG. 20 shows a block diagram of triple speed dubbing apparatus equipped with audio signal interpolators, which is a third embodiment of the present invention.
Figure 21:
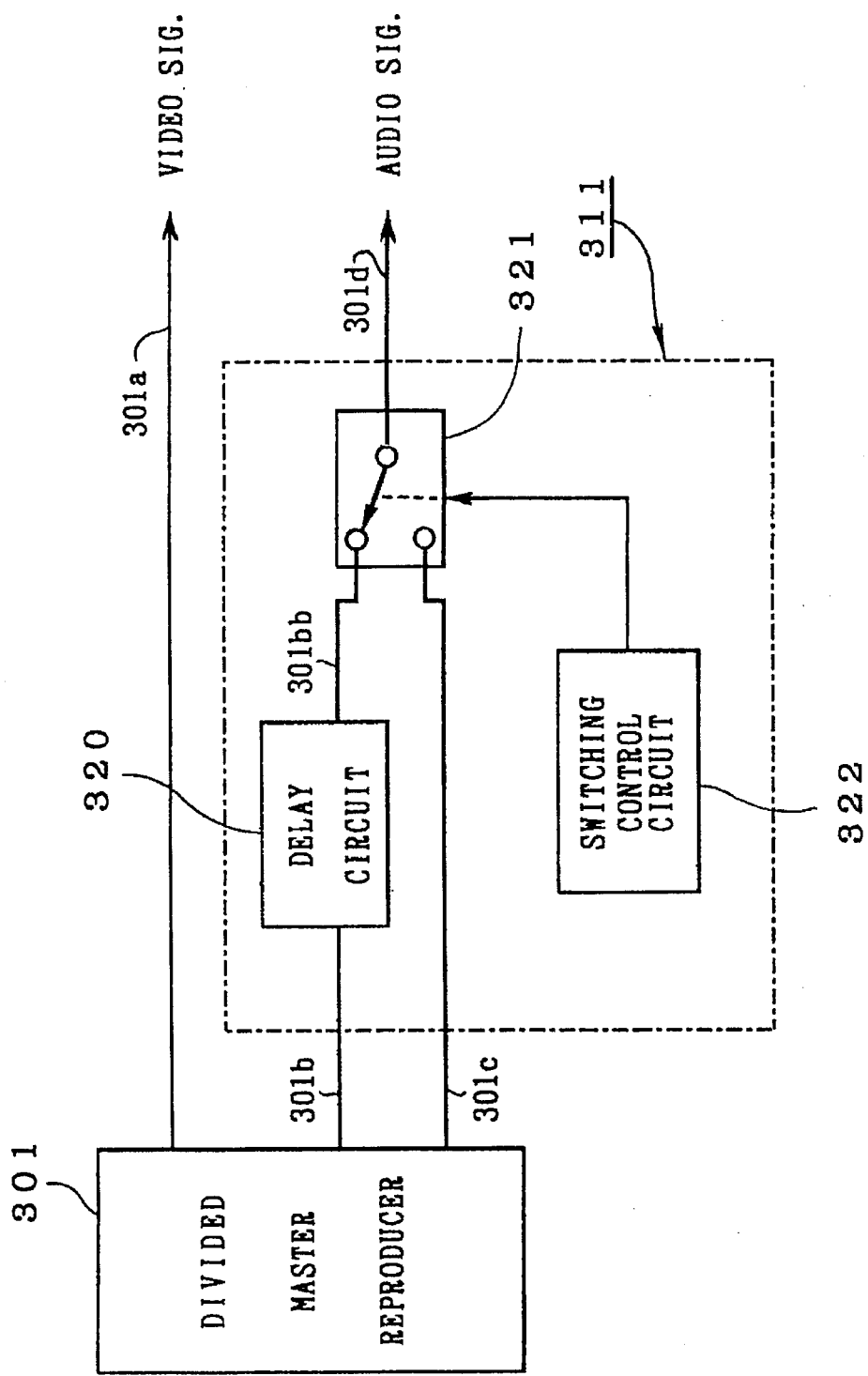
FIG. 21 shows a block diagram of the audio signal interpolator used on the triple speed dubbing apparatus shown in FIG. 20.

FIG. 20 shows a schematic diagram of triple speed dubbing apparatus "E" equipped with audio signal interpolators 311, 312, 313, which is a third embodiment of the present invention. And FIG. 21 shows a schematic diagram of the audio signal interpolator used on the triple speed dubbing apparatus "D" shown in FIG. 20. The 1st to 3rd divided master tape reproducers 301, 302, 303 in FIG. 20 are capable of playing respectively the 1st to 3rd divided master tapes MDA, MDB, MDC each recorded with the same divided video data signals as that used in the second embodiment 2 and divided audio data signals just explained before with reference to FIGS. 19(c) and 19(d). The 1st to 3rd divided master tape reproducers 301, 302, 303 are basically same catalog item VTRs shown as 232, 233, 234 in FIG. 18, of which the playback function, instead of its recording function, is utilized in the dubbing apparatus "E".

Playing the above mentioned divided master tape MDA at the real time speed, the 1st divided master tape reproducer 301 outputs a video data signal 301a, a nondelayed audio data signal 301b like shown in FIG. 19(c) and a delayed audio data signal 301c like shown in FIG. 19(d). Similarly, the 2nd divided master tape reproducer 302 outputs a video data signal 302a, a nondelayed audio data signal 302b and a delayed audio data signal 302c, the 3rd divided master tape reproducer 303 outputs a video data signal 303a, a nondelayed audio data signal 303b and a delayed audio data signal 303c.

Figure 14:
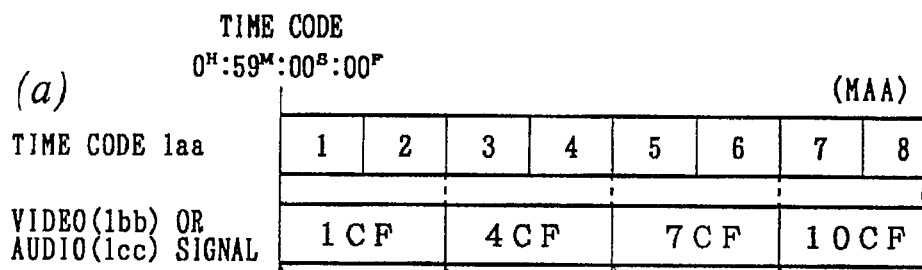
FIGS. 14(a) through 14(e) show signal configurations and producing process of a triple speed recording signal according to the second embodiment of the present invention.
Figure 14:
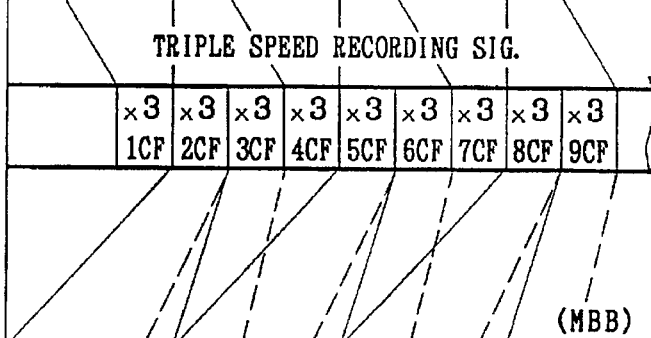
Figure 14:
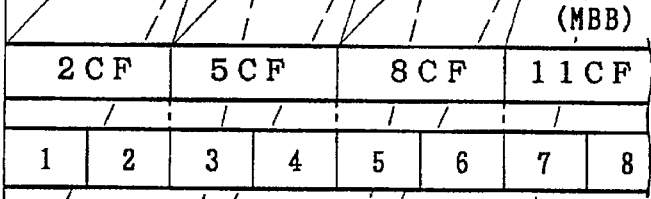
Figure 14:
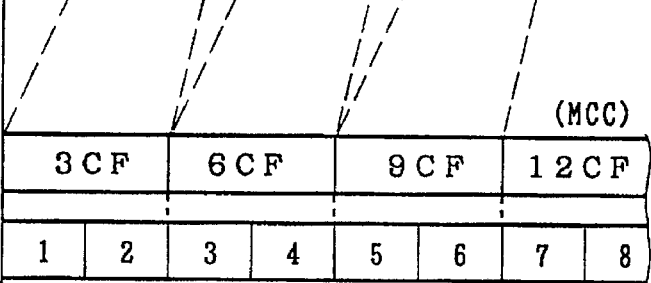
Figure 14:
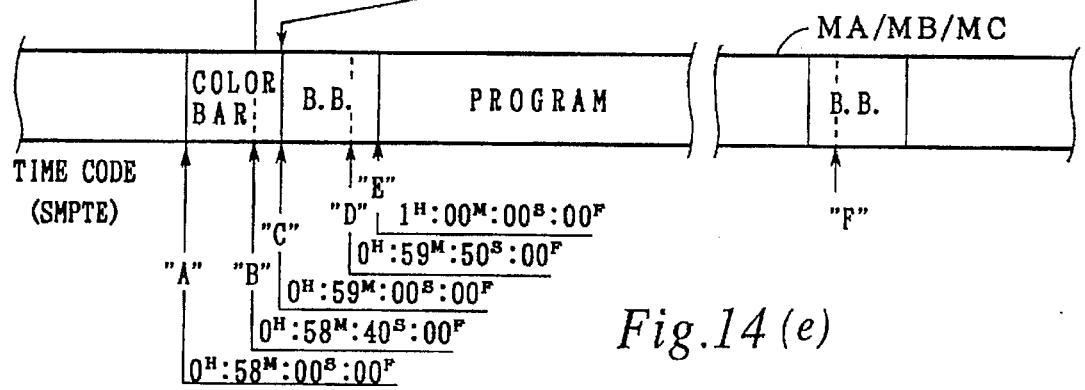

In this triple speed dubbing apparatus "E", the 1st to 3rd divided master tape reproducers 301, 302, 303 are controlled by the duplication system control device 207 to playback simultaneously and synchronously each other the 1st to 3rd divided master tapes MDA, MDB, MDC from their respective "starting" points of the programs in the same manner explained with reference to FIG. 14, by monitoring time codes recorded on the 1st to 3rd divided master tapes MDA, MDB, MDC upon their production.

The respective lost data portions of the audio data signals 301b and 301c are restored by interpolation performed in the audio signal interpolator 311, so that an output 301d of the interpolator 311 having a form similar to the one shown in FIG. 19(a) or 19(b) is supplied to a subsequent audio signal bit rate and order conversion device 305.

Similarly, the audio data signals 302b and 302c are loss restored by the interpolator 312 to become an output 302d and the audio data signals 303b and 303c are loss restored by the interpolator 313 to become an output 303d, in turn, these outputs are supplied to the audio signal bit rate and order conversion device 305.

The audio signal interpolator 311 is comprised of a delay circuit 320, a switching device 321 and a switching control circuit 322 as shown in FIG. 21. The audio data signal 301b having no delay, undergoes a predetermined amount of delay in the delay circuit 320 and an output 301bb form the delay circuit 320 is supplied to the switching device 321. The audio data signal 301c having the delay explained before is supplied as it is to the switching device 321, which selectively outputs the output 301bb and the audio data signal 301c responsive to a control of the switching control circuit 322. This switching control is performed as such that the data loss portions such as Dn, Dn+1, Dn+2 . . . are excluded from being outputted, in other words, the switching device 321 outputs signal portions which are preceding to or succeeding from the data loss portion. The other interpolators 312 and 313 have the same configuration and operations. The predetermined amount of delay caused in the delay circuit 320, is same as the delay time Td caused in the delay circuit 272 in FIG. 18.

For the audio signal interpolator 311, 312 or 313, memory devices (RAMs) can be utilized by controlling their read and write addresses.

Figure 22:
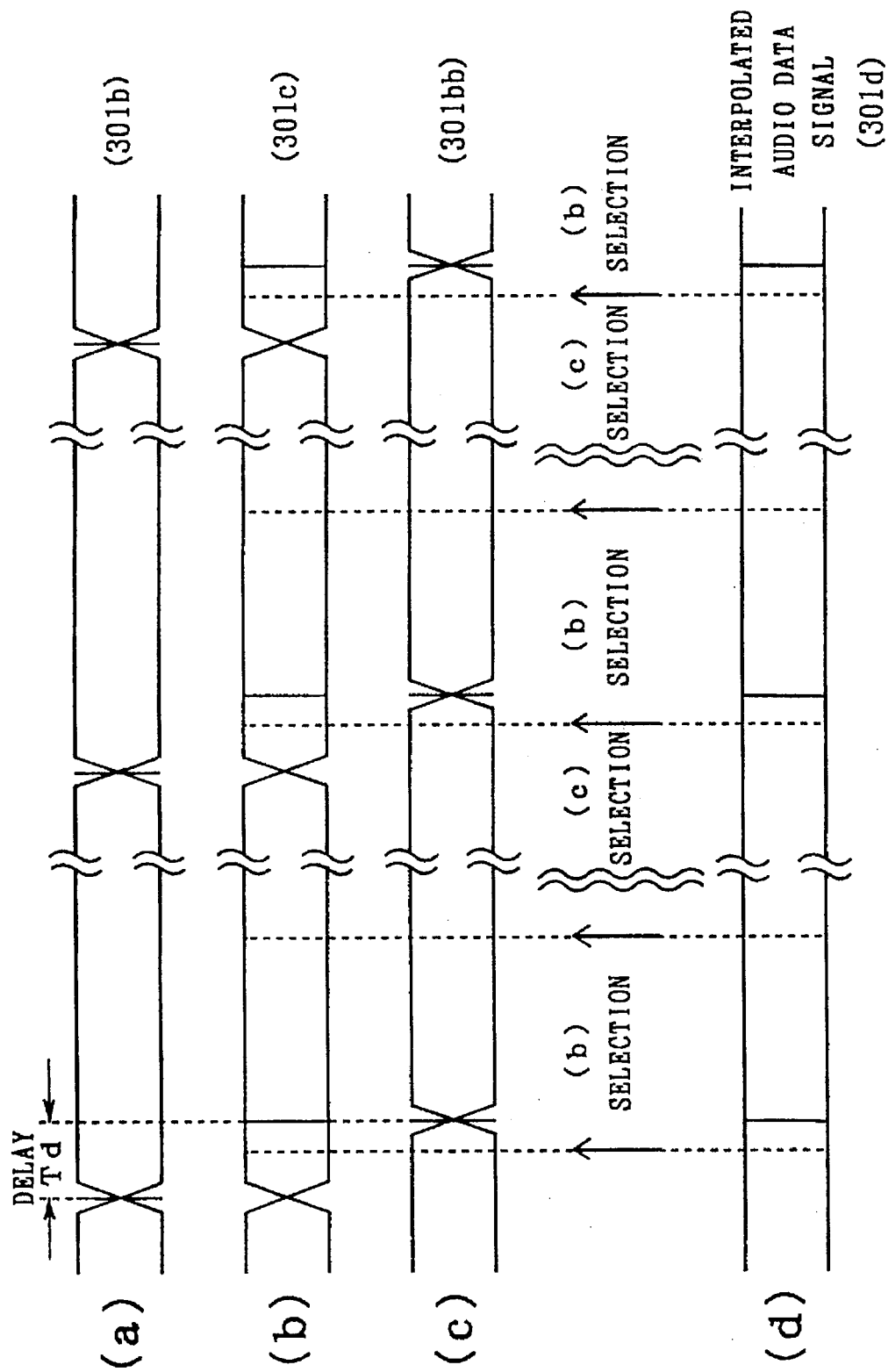
FIG. 22 illustrates various statuses of audio data strings referred to in the explanation of the audio signal interpolation processings in the audio signal interpolator shown in FIG. 21.

FIG. 22 conceptually illustrates various statuses of audio data string which are subjected to the above mentioned data interpolation.

FIG. 22(a) shows a status of the audio data signal 301b, and FIG. 22(b) shows a status of the audio data signal 301c. FIG. 22(c) indicates the output 301bb which is resulted from delaying the data signal 301b by the amount Td in the delay circuit 320. By doing the above, a time difference between the audio data signals 301b and 301c becomes 0. The switching control circuit 322 controls the switching device 321 to select the signals 301b and 301c at a switch timing shown as "(b) or (c) SELECTION" In FIG. 22. Here, "(b) SELECTION" means that the signal 301c is selected to output during a time span between the 2 upward arrows, and "(c) SELECTION" means that the signal 301bb is selected to output in the subsequent time span. Accordingly, the audio data signal 301d having the data loss being restored by interpolation, is obtained as shown in FIG. 22(d). For this signal selection, one of the switching points indicated by arrows may be located at around but excluding the data loss portion of either the signal 301c or the signal 301bb, and another switching point located at other than a proximity of the data loss portion, may freely be determined, a time span between 2 adjacent switching points as well. In this regard, it is important for the switching point determination to exclude the data loss portion and to match with the distance between two of the "STOP/START POINT OF RECORDING" shown in FIG. 19 and with the amount of delay time Td.

Accordingly, the audio data signals 301d, 302d, 303d having their data loss portions restored are supplied to the audio signal bit rate and order conversion device 305 simultaneously. Thereafter both video and audio data processings are same as that explained with reference to FIG. 11, namely, the configuration of the video data signals 301a, 302a, 303a is restored back to the original data order as recorded on the original master tape "M" by a video signal bit rate and order conversion device 304, and the same of the audio data signals 301d, 302d, 303d is restored back to the original data order as recorded on the original master tape "M" by the audio signal bit rate and order conversion device 305, and both the video and audio data signals are read out respectively from the video and audio signal bit rate and order conversion devices 304 and 305 at a triple speed data rate and D/A-converted and distributed respectively by video and audio signal dividers 306 and 307 to triple speed recorders 308a through 308k for dubbing a plurality of slave tapes loaded respectively thereto. The triple speed recorders 308a through 308k are essentially same machines as that shown in FIGS. 11 and 13. which are running at 3 times the standard tape speed.

Further, since the divided master tape producing apparatus stores signals divided into N channels in memory devices and then continuously reads them out and supplies them to corresponding divided master tape recording devices, it is possible to prolong the time of intermittent recording operation of the divided master tape recording device and record signals with improved stability.

Further, since the divided master tape producing apparatus according to the present invention stores the reproduced original master signal of the master tape temporarily in a memory circuit and then reads and records it by corresponding divided master tape recording devices, it is possible to produce the divided master tapes efficiently.

Further, since the dubbing apparatus according to the present invention delays the signal, which is originally recorded on a tape without delay, by a delay circuit to remove a time difference from the signal recorded with delay and selects portions of audio signal which are not subjected to fade-in and fade-out process, it is possible to obtain a continuous audio signal even when a device which performs fade-in and fade-out processings of audio signal at editing points, is used.

What is claimed is:

1. A dubbing apparatus comprising:

an original master tape playback device for playing back an original master tape recorded with an original master signal having an original signal sequence;

signal dividing means for dividing said original master signal time-divisionally into predetermined signal segments of equal length forming an N number of divided master signal chains by distributing said predetermined signal segments in consecutive succession among said N number of divided master signal chains where N is an integer greater than 1;

N number of master signal recording devices for respectively recording said N number of divided master signal chains along with N series of time codes respectively on N number of master tapes;

control means for causing said N number of master signal recording devices to drive intermittently said N number of master tapes to be recorded, so that each of said N number of divided master signal chains becomes continuous without time interruption on each of said N number of master tapes;

N number of master tape playback devices for synchronously and simultaneously playing back at a real time speed said N number of master tapes together by reading said N series of time codes;

N-times speed recording signal producing means for time-compressing each of said N number of divided master signal chains reproduced from said N number of master tape playback devices into 1/N to obtain N-times speed recording signals while restoring said original signal sequence in each of said N-times speed recording signals; and recording means for recording said N-times speed recording signals on a plurality of slave tapes each running at a speed which is N-times a normal playback speed of said slave tapes.

2. A dubbing apparatus claimed in claim 1, wherein said signal dividing means comprises memory means for storing said N number of divided master signal chains and means for supplying said N number of divided master signal chains stored in said memory means to said N number of master signal recording devices.

3. A dubbing apparatus claimed in claim 1, wherein said signal dividing means comprises means for storing contents of said original master signal reproduced from said original master tape playback device and means for controlling said storing means so as to produce said N number of divided master signal chains being outputted from said storing means and to supply said N number of divided master signal chains to said N number of master signal recording devices.

4. A dubbing apparatus as claimed in claim 1, wherein said original master signal includes an original audio signal and each of said N number of master tapes is recorded with a first audio signal having a predetermined delay time, and a second audio signal having no delay, said first and second audio signals being derived from said original audio signal, said dubbing apparatus further comprises a delay circuit for delaying said second audio signal reproduced from a corresponding one of said N number of master tape playback devices, and audio signal switching means for selectively outputting one of said first audio signal having a predetermined delay time and said second audio signal delayed by said delay circuit, so that said one of the first and second audio signals selected by said audio signal switching means for outputting, is not subjected to an editing point of said original audio signal.

5. A dubbing apparatus claimed in claim 1, wherein said original master signal is in an analog signal and said signal dividing means comprises an analog to digital conversion means for converting said original master signal into a digital format to produce said N number of divided master signal chains.

6. A dubbing apparatus claimed in claim 1, where in said N number of master signal recording devices are digital devices.

7. A dubbing apparatus claimed in claim 1, wherein said N number of divided master signal chains respectively recorded on N number of master tapes are in a digital format, said N-times speed recording signal producing means comprises bit rate convertors with memory means and said N number of divided master signal chains in the digital format are written in and read out from said memory means for producing said N-times speed recording signals.

8. A dubbing apparatus claimed in claim 1, wherein said N number of master tape playback devices play back said N number of master tapes synchronously and simultaneously and are controlled by a timing signal supplied thereto.

9. A dubbing apparatus as claimed in claim 1, wherein said equal length is a length of one of a group consisting of one video field, one video frame, one color frame and two video frames of said original master signal.

10. A dubbing apparatus claimed in claim 1, wherein N is 2 and said original master signal is time-divisionally divided into odd numbered color frames and even numbered color frames.

11. A triple speed dubbing apparatus comprising:

an original master tape playback device for playing back an original master tape recorded with an original master signal having an original signal sequence;

signal dividing means for dividing said original master signal time-divisionally into predetermined signal segments of equal length forming 3 divided master signal chains by distributing said predetermined signal segments in consecutive succession among said 3 divided master signal chains;

3 master signal recording devices for recording said 3 divided master signal chains respectively on 3 master tapes, control means for causing said 3 master signal recording devices to drive intermittently said 3 master tapes to be recorded, so that each of said 3 divided master signal chains becomes continuous without time interruption on each of said 3 master tapes;

3 master tape playback devices for synchronously and simultaneously playing back at a real time speed said 3 master tapes respectively;

triple speed recording signal producing means for time-compressing each of said 3 divided master signal chains reproduced from said 3 master tape playback devices into ⅓ to obtain triple speed recording signals while restoring said original signal sequence in each of said triple speed recording signals; and recording means for recording said triple speed recording signals on a plurality of slave tapes each running at a speed which is 3 times a normal playback speed of said slave tapes.

12. A divided master tape producing apparatus comprising:

an original master tape playback device for playing back an original master tape recorded with an original master signal having an original signal sequence;

signal dividing means for dividing said original master signal time-divisionally into predetermined signal segments of equal length, each of said predetermined signal segments being one of a group consisting of one video field, one video frame, one color frame and two video frames forming an N number of divided master signal chains by distributing said predetermined signal segments in consecutive succession among said N number of divided master signal chains where N is greater than 1, said signal dividing means comprising means for storing contents of said original master signal reproduced from said original master tape playback device and controlling means for controlling said storing means so as to produce said N number of divided master signal chains being outputted from said storing means; and N number of master signal recording devices for recording said N number of divided master signal chains along with N series of time codes respectively on N number of master tapes, said controlling means causing said N number of master signal recording devices to drive intermittently said N number of master tapes to be recorded, so that each of said N number of divided master signal chains becomes continuous without time interruption on each of said N number of tapes.

* * * * *

UNITED STATES PATENT AND TRADEMARK OFFICE
CERTIFICATE OF CORRECTION

PATENT NO.   : 5,636,311
DATED        : June 3, 1997
INVENTOR(S)  : Nakatani

It is certified that error appears in the above-identified patent and that said Letters Patent is hereby corrected as shown below:

Column 22, line 64, change "mater" to -- master --.

Column 24, line 31, change "D" to -- E --.

Signed and Sealed this

Sixteenth Day of February, 1999

Attest:

*Attesting Officer*

*Acting Commissioner of Patents and Trademarks*